(12) United States Patent
Kamkar et al.

(10) Patent No.: US 12,169,766 B2
(45) Date of Patent: *Dec. 17, 2024

(54) SYSTEMS AND METHODS FOR MODEL FAIRNESS

(71) Applicant: ZestFinance, Inc., Burbank, CA (US)

(72) Inventors: Sean Javad Kamkar, Burbank, CA (US); Michael Egan Van Veen, Burbank, CA (US); Feng Li, Burbank, CA (US); Mark Frederick Eberstein, Burbank, CA (US); Jose Efrain Valentin, Burbank, CA (US); Jerome Louis Budzik, Burbank, CA (US); John Wickens Lamb Merrill, Burbank, CA (US)

(73) Assignee: ZestFinance, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,763

(22) Filed: Dec. 12, 2023

(65) Prior Publication Data

US 2024/0127125 A1     Apr. 18, 2024

Related U.S. Application Data

(63) Continuation of application No. 17/147,025, filed on Jan. 12, 2021, now Pat. No. 11,893,466, which is a continuation of application No. 16/822,908, filed on Mar. 18, 2020, now Pat. No. 10,977,729.

(60) Provisional application No. 62/820,147, filed on Mar. 18, 2019.

(51) Int. Cl.
*G06N 20/20*     (2019.01)
*G06F 18/214*     (2023.01)
*G06N 3/045*     (2023.01)
*G06N 7/01*     (2023.01)
*G06Q 40/03*     (2023.01)

(52) U.S. Cl.
CPC ......... *G06N 20/20* (2019.01); *G06F 18/2148* (2023.01); *G06N 3/045* (2023.01); *G06N 7/01* (2023.01); *G06Q 40/03* (2023.01)

(58) Field of Classification Search
None
See application file for complete search history.

(56) References Cited

U.S. PATENT DOCUMENTS

| 525,413 A | 9/1894 | Gates |
| 5,745,654 A | 4/1998 | Titan |
| 5,999,938 A | 12/1999 | Bliss et al. |

(Continued)

FOREIGN PATENT DOCUMENTS

| WO | 2014014047 A1 | 1/2014 |
| WO | 2014055238 A1 | 4/2014 |

(Continued)

OTHER PUBLICATIONS

International Search Report and Written Opinion for application No. PCT/US20/062235, dated Mar. 10, 2021.

(Continued)

*Primary Examiner* — Folashade Anderson
(74) *Attorney, Agent, or Firm* — Troutman Pepper Hamilton Sanders LLP; Christopher J. Forstner; Nicholas J. Gallo

(57) ABSTRACT

Systems and methods for training models to improve fairness.

22 Claims, 10 Drawing Sheets

(56) References Cited

U.S. PATENT DOCUMENTS

| | | |
|---|---|---|
| 6,034,314 A | 3/2000 | Koike |
| 6,877,656 B1 | 4/2005 | Jaros et al. |
| 7,035,811 B2 | 4/2006 | Gorenstein |
| 7,280,980 B1 | 10/2007 | Hoadley et al. |
| 7,467,116 B2 | 12/2008 | Wang |
| 7,499,919 B2 | 3/2009 | Meyerzon et al. |
| 7,542,993 B2 | 6/2009 | Satterfield et al. |
| 7,610,257 B1 | 10/2009 | Abrahams |
| 7,711,635 B2 | 5/2010 | Steele et al. |
| 7,765,151 B1 | 7/2010 | Williams et al. |
| 7,813,945 B2 | 10/2010 | Bonissone et al. |
| 7,873,535 B2 | 1/2011 | Umblijs et al. |
| 7,873,570 B2 | 1/2011 | Cagan et al. |
| 7,921,359 B2 | 4/2011 | Friebel |
| 7,941,363 B2 | 5/2011 | Tanaka et al. |
| 7,941,425 B2 | 5/2011 | Sahu et al. |
| 7,970,676 B2 | 6/2011 | Feinstein |
| 7,987,177 B2 | 7/2011 | Beyer et al. |
| 7,996,392 B2 | 8/2011 | Liao et al. |
| 8,078,524 B2 | 12/2011 | Crawford et al. |
| 8,086,523 B1 | 12/2011 | Palmer |
| 8,166,000 B2 | 4/2012 | Labrie et al. |
| 8,200,511 B2 | 6/2012 | Zizzamia et al. |
| 8,219,500 B2 | 7/2012 | Galbreath et al. |
| 8,280,805 B1 | 10/2012 | Abrahams |
| 8,335,741 B2 | 12/2012 | Kornegay et al. |
| 8,442,886 B1 | 5/2013 | Haggerty et al. |
| 8,452,699 B2 | 5/2013 | Crooks |
| 8,515,842 B2 | 8/2013 | Papadimitriou |
| 8,554,756 B2 | 10/2013 | Gemmell et al. |
| 8,560,436 B2 | 10/2013 | Lau et al. |
| 8,600,966 B2 | 12/2013 | Kravcik |
| 8,626,645 B1 | 1/2014 | Lazerson |
| 8,645,417 B2 | 2/2014 | Groeneveld et al. |
| 8,660,943 B1 | 2/2014 | Chirehdast |
| 8,694,401 B2 | 4/2014 | Stewart |
| 8,744,946 B2 | 6/2014 | Shelton |
| 8,799,150 B2 | 8/2014 | Annappindi |
| 9,047,392 B2 | 6/2015 | Wilkes et al. |
| 9,268,850 B2 | 2/2016 | El-Charif et al. |
| 9,405,835 B2 | 8/2016 | Wheeler et al. |
| 9,501,749 B1 | 11/2016 | Narsky |
| 9,686,863 B2 | 6/2017 | Chung et al. |
| 10,121,115 B2 | 11/2018 | Chrapko |
| 10,581,887 B1 | 3/2020 | Dinerstein |
| 10,684,598 B1 | 6/2020 | Alanqar et al. |
| 10,719,301 B1 | 7/2020 | Dasgupta et al. |
| 10,824,959 B1 | 11/2020 | Chatterjee |
| 10,977,558 B2 | 4/2021 | Herbster |
| 11,734,612 B2 * | 8/2023 | Jesus .............. G06N 3/0475 706/12 |
| 11,941,650 B2 * | 3/2024 | Merrill .............. G06N 5/04 |
| 2002/0038277 A1 | 3/2002 | Yuan |
| 2002/0091650 A1 | 7/2002 | Ellis |
| 2002/0138414 A1 | 9/2002 | Baker |
| 2002/0178113 A1 | 11/2002 | Clifford et al. |
| 2003/0009369 A1 | 1/2003 | Gorenstein |
| 2003/0033242 A1 | 2/2003 | Lynch et al. |
| 2003/0033587 A1 | 2/2003 | Ferguson et al. |
| 2003/0046223 A1 | 3/2003 | Crawford et al. |
| 2003/0101080 A1 | 5/2003 | Zizzamia et al. |
| 2003/0147558 A1 | 8/2003 | Loui et al. |
| 2003/0176931 A1 | 9/2003 | Pednault |
| 2004/0068509 A1 | 4/2004 | Garden et al. |
| 2004/0107161 A1 | 6/2004 | Tanaka et al. |
| 2004/0199456 A1 | 10/2004 | Flint et al. |
| 2005/0055296 A1 | 3/2005 | Hattersley et al. |
| 2005/0114279 A1 | 5/2005 | Scarborough et al. |
| 2005/0234762 A1 | 10/2005 | Pinto |
| 2005/0278246 A1 | 12/2005 | Friedman et al. |
| 2006/0047613 A1 | 3/2006 | Labreuche |
| 2006/0083214 A1 | 4/2006 | Grim, III |
| 2006/0106570 A1 | 5/2006 | Feldman |
| 2006/0112039 A1 | 5/2006 | Wang |
| 2006/0167654 A1 | 7/2006 | Keinan et al. |
| 2006/0200396 A1 | 9/2006 | Satterfield et al. |
| 2006/0218067 A1 | 9/2006 | Steele |
| 2007/0005313 A1 | 1/2007 | Sevastyanov |
| 2007/0011175 A1 | 1/2007 | Langseth |
| 2007/0016542 A1 | 1/2007 | Rosauer et al. |
| 2007/0050286 A1 | 3/2007 | Abrahams |
| 2007/0055619 A1 | 3/2007 | Abrahams |
| 2007/0067284 A1 | 3/2007 | Meyerzon et al. |
| 2007/0106550 A1 | 5/2007 | Umblijs et al. |
| 2007/0112668 A1 | 5/2007 | Celano et al. |
| 2007/0124236 A1 | 5/2007 | Grichnik et al. |
| 2007/0288338 A1 | 12/2007 | Hoadley et al. |
| 2008/0133402 A1 | 6/2008 | Kurian et al. |
| 2008/0208820 A1 | 8/2008 | Usey et al. |
| 2008/0222061 A1 | 9/2008 | Soetjahja |
| 2008/0306893 A1 | 12/2008 | Saidi et al. |
| 2008/0307006 A1 | 12/2008 | Lee |
| 2009/0006283 A1 | 1/2009 | Labrie et al. |
| 2009/0006356 A1 | 1/2009 | Liao et al. |
| 2009/0015433 A1 | 1/2009 | James |
| 2009/0024517 A1 | 1/2009 | Crooks |
| 2009/0030888 A1 | 1/2009 | Sahu et al. |
| 2009/0037308 A1 | 2/2009 | Feinstein |
| 2009/0192980 A1 | 7/2009 | Beyer et al. |
| 2009/0216748 A1 | 8/2009 | Kravcik |
| 2009/0254572 A1 | 10/2009 | Redlich et al. |
| 2009/0299911 A1 | 12/2009 | Abrahams |
| 2009/0319521 A1 | 12/2009 | Groeneveld et al. |
| 2010/0005018 A1 | 1/2010 | Tidwell |
| 2010/0010878 A1 | 1/2010 | Pinto et al. |
| 2010/0010935 A1 | 1/2010 | Shelton |
| 2010/0082476 A1 | 4/2010 | Bowman |
| 2010/0257459 A1 | 10/2010 | Galbreath et al. |
| 2010/0325067 A1 | 12/2010 | Cagan et al. |
| 2011/0071969 A1 | 3/2011 | Doctor et al. |
| 2011/0078073 A1 | 3/2011 | Annappindi |
| 2011/0112957 A1 | 5/2011 | Ingram et al. |
| 2011/0161263 A1 | 6/2011 | Lee |
| 2011/0173116 A1 | 7/2011 | Yan |
| 2011/0178902 A1 | 7/2011 | Imrey |
| 2011/0184941 A1 | 7/2011 | El-Charif et al. |
| 2011/0320423 A1 | 12/2011 | Gemmell et al. |
| 2012/0053951 A1 | 3/2012 | Kowalchuk et al. |
| 2012/0059819 A1 | 3/2012 | Wheeler et al. |
| 2012/0066106 A1 | 3/2012 | Papadimitriou |
| 2012/0066116 A1 | 3/2012 | Kornegay et al. |
| 2012/0072029 A1 | 3/2012 | Persaud et al. |
| 2012/0082476 A1 | 4/2012 | Ito et al. |
| 2012/0239613 A1 | 9/2012 | Danciu |
| 2013/0091050 A1 | 4/2013 | Merrill |
| 2013/0103569 A1 | 4/2013 | Gopinathan |
| 2013/0138553 A1 | 5/2013 | Nikankin et al. |
| 2013/0185189 A1 | 7/2013 | Stewart |
| 2014/0012794 A1 | 1/2014 | Dillon et al. |
| 2014/0014047 A1 | 1/2014 | Garcia et al. |
| 2014/0025872 A1 | 1/2014 | Flynn |
| 2014/0052604 A9 | 2/2014 | Stewart |
| 2014/0081832 A1 | 3/2014 | Merrill et al. |
| 2014/0108665 A1 | 4/2014 | Arora |
| 2014/0122355 A1 | 5/2014 | Hardtke et al. |
| 2014/0149177 A1 | 5/2014 | Frank et al. |
| 2014/0172886 A1 | 6/2014 | Wilkes et al. |
| 2014/0180790 A1 | 6/2014 | Boal |
| 2014/0181267 A1 | 6/2014 | Wadkins |
| 2014/0310661 A1 | 10/2014 | Frederickson et al. |
| 2014/0310681 A1 | 10/2014 | Poozhiyil |
| 2015/0019912 A1 | 1/2015 | Darling et al. |
| 2015/0056229 A1 | 2/2015 | Nandy et al. |
| 2015/0081602 A1 | 3/2015 | Talley et al. |
| 2015/0161098 A1 | 6/2015 | Granshaw |
| 2015/0213361 A1 | 7/2015 | Gamon |
| 2015/0317337 A1 | 11/2015 | Edgar |
| 2015/0347485 A1 | 12/2015 | Cai |
| 2015/0379428 A1 | 12/2015 | Dirac et al. |
| 2016/0042292 A1 | 2/2016 | Caplan |
| 2016/0088723 A1 | 3/2016 | Chung et al. |
| 2016/0110353 A1 | 4/2016 | Merrill et al. |
| 2016/0132787 A1 | 5/2016 | Drevo et al. |
| 2016/0300252 A1 | 10/2016 | Frank et al. |

(56) References Cited

U.S. PATENT DOCUMENTS

| | | |
|---|---|---|
| 2016/0371238 A1 | 12/2016 | Heavenrich |
| 2017/0061326 A1 | 3/2017 | Talathi et al. |
| 2017/0109657 A1 | 4/2017 | Marcu |
| 2017/0124464 A1 | 5/2017 | Crabtree et al. |
| 2017/0140518 A1 | 5/2017 | Liang et al. |
| 2017/0220633 A1 | 8/2017 | Porath |
| 2017/0222960 A1 | 8/2017 | Agarwal et al. |
| 2017/0316311 A1 | 11/2017 | Pilly |
| 2017/0330058 A1 | 11/2017 | Silberman et al. |
| 2018/0018578 A1 | 1/2018 | Yoshizumi |
| 2018/0025273 A1 | 1/2018 | Jordan |
| 2018/0060738 A1 | 3/2018 | Achin |
| 2018/0068219 A1 | 3/2018 | Turner |
| 2018/0268262 A1 | 9/2018 | Osada |
| 2018/0293712 A1 | 10/2018 | Vogels et al. |
| 2018/0322406 A1 | 11/2018 | Merrill et al. |
| 2018/0349986 A1 | 12/2018 | Fidanza |
| 2019/0043070 A1 | 2/2019 | Merrill et al. |
| 2019/0114704 A1 | 4/2019 | Way |
| 2019/0228006 A1 | 7/2019 | Tormasov et al. |
| 2019/0244122 A1 | 8/2019 | Li |
| 2019/0279111 A1 | 9/2019 | Merrill et al. |
| 2019/0287025 A1 | 9/2019 | Perez |
| 2019/0303404 A1 | 10/2019 | Amer |
| 2019/0311298 A1 | 10/2019 | Kopp et al. |
| 2019/0318421 A1 | 10/2019 | Lyonnet |
| 2019/0340518 A1 | 11/2019 | Merrill et al. |
| 2019/0340684 A1 | 11/2019 | Belanger et al. |
| 2019/0347557 A1 | 11/2019 | Khan |
| 2019/0354806 A1 | 11/2019 | Chhabra |
| 2019/0354853 A1 | 11/2019 | Zoldi |
| 2019/0378210 A1 | 12/2019 | Merrill et al. |
| 2020/0005136 A1 | 1/2020 | Spryn |
| 2020/0012917 A1 | 1/2020 | Pham et al. |
| 2020/0082299 A1 | 3/2020 | Vasconcelos |
| 2020/0160177 A1 | 5/2020 | Durand |
| 2020/0175586 A1 | 6/2020 | McKenna |
| 2020/0183047 A1 | 6/2020 | Denli et al. |
| 2020/0231466 A1 | 7/2020 | Lu |
| 2020/0242492 A1 | 7/2020 | Goel |
| 2020/0257927 A1 | 8/2020 | Nomi |
| 2020/0257961 A1 | 8/2020 | Hua et al. |
| 2021/0019603 A1 | 1/2021 | Friedman |
| 2021/0133631 A1 | 5/2021 | Prendki |
| 2021/0174258 A1* | 6/2021 | Wenchel ............... G06N 20/00 |
| 2021/0209688 A1 | 7/2021 | Krishnamurthy |
| 2021/0224605 A1 | 7/2021 | Zhang |
| 2021/0256392 A1 | 8/2021 | Zhengzhang |
| 2021/0281491 A1 | 9/2021 | Yelahanka Raghuprasad |
| 2021/0406712 A1* | 12/2021 | Bhide .................. G06N 3/08 |
| 2021/0406815 A1 | 12/2021 | Mimassi |
| 2022/0019741 A1 | 1/2022 | Roy |
| 2022/0114399 A1* | 4/2022 | Castiglione ........ G06V 10/751 |
| 2022/0122171 A1 | 4/2022 | Hubard |
| 2022/0164877 A1* | 5/2022 | Kamkar ............ G06F 18/24323 |
| 2022/0188519 A1 | 6/2022 | Briody |
| 2022/0188568 A1 | 6/2022 | Singh |
| 2022/0191332 A1 | 6/2022 | Ahmadi |
| 2023/0085575 A1 | 3/2023 | Zoldi et al. |

FOREIGN PATENT DOCUMENTS

| | | |
|---|---|---|
| WO | 2014121019 A1 | 8/2014 |
| WO | 2014184381 A2 | 11/2014 |
| WO | 2015056229 A1 | 4/2015 |
| WO | 2015081160 A1 | 6/2015 |
| WO | 2019028179 A1 | 2/2019 |

OTHER PUBLICATIONS

Office Action (Non-Final Rejection) dated Mar. 2, 2022 for U.S. Appl. No. 16/434,731 (pp. 1-6).

Zhang, et al., 2018. "Mitigating Unwanted Biases with Adversarial Learning," In Proceedings of the 2018 AAAI/ACM Conference on AI, Ethics, and Society (AIES '18). Association for Computing Machinery, New York, NY, USA, 335-340.

International Search Report issued in PCT/US2013/060208, dated Jan. 7, 2014, 2 pages.

Zhao, Zheng , et al., "On Similarity Preserving Feature Selection", IEEE Transactions on Knowledge and Data Engineering 25,2011, pp. 619-632.

Demaine, Erik D., et al., "Correlation clustering in general weighted graphs", Theorectical Computer Science 361 2006)172-187.

Ivanov, Alexei, et al., "Kolmogorov-Smirnov test for feature selection in emotion recognition from speech", IEEE International Conference on acoustics, speech and signal processing (ICASSP), 2012, pp. 5125-5128.

International Preliminary Report on Patentability issued in PCT/US2013/060208, dated Mar. 24, 2015, 8 pages.

"Bit Array", Wikipedia Search, May 5, 2021 at https://en.wikipedia.org/wiki/Bit_array.

"Genetic algorithm", Wikipedia Search, May 5, 2021 at https://en.wikipedia.org/wiki/Gentic_algorithm.

"Feature Selection" from Wikipedia and obtained in the Wayback machine at URL "https://en.wikipedia.org/wiki/Feature_selection" for Feb. 25, 2021.

"Feature Selection", Wikipedia and obtained in the Wayback machine at URL http://en.wikipedia.org/wiki/Feature_selection, Sep. 1, 2011.

Bittencourt, H.R et al., "Feature Selection by Using Classification and Regression Trees (CART)", dated Aug. 23, 2004.

Strobl, Carolin , et al., "Conditional Variable Importance for Random Forests", BMC Bioinformatics 2008, 9:307, published Jul. 11, 2008.

Tuv, Eugene , et al., "Feature Selection with Ensembles, Artificial Variables, and Redundancy Elimination", Journal of Machine Learning Research, pp. 1341-1366, Jul. 2009.

"On the Convergence of Generalized Hill Climbing Algorithms" by A.W. Johnson et al. copyright 2002, Elsevier Science B.V., Discrete Applied Mathematics (Year: 2002).

Office Action (Non-Final Rejection) dated Dec. 16, 2021 for U.S. Appl. No. 15/977,105 (pp. 1-19).

International Search Report dated May 5, 2014 in corresponding PCT Application No. PCT/US2014/014047.

International Preliminary Report on Patentability dated Aug. 4, 2015 in corresponding PCT Application No. PCT/US2014/014047.

Office Action (Final Rejection) dated Dec. 7, 2021 for U.S. Appl. No. 16/109,545 (pp. 1-17).

"International Search Report and the Written Opinion, Application No. PCT/US14/014047, dated May 5, 2014."

Office Action (Notice of Allowance and Fees Due (PTOL-85)) dated Nov. 19, 2021 for U.S. Appl. No. 16/292,844 (pp. 1-8).

Mondarres, Ceena et al., Towards Explainable Deep Learning for Credit Lending: A Case Study Proc. Workshop Challenges Opportunities AI Financial Services: Impact Fairness Explainability Accuracy Privacy (NIPS), 2018 ( Year: 2018).

Chen, Jiahao, Fair lending needs explainable models for responsible recommendation Proceedings of the Second Workshop on Responsible Recommendation, 2018 (Year: 2018).

Ribeiro, Marco Tulio et al., Why Should | Trust You?—Explaining Predictions of Any Classifier ACM, 2016 (Year: 2016).

Gates, Susan Wharton et al., 4/3 Automated Underwriting: Friend or Foe to Low-Mod Households and Neighborhoods? Building Assets, Building Credit, Symposium, Nov. 2003 (Year: 2003).

Wattenber, Martin et al., Attacking discrimination with smarter machine learning Google Research, 2016 (Year: 2016).

Data Bias and Algorithmic Discrimination University of Montreal, 2017 (Year: 2017).

Office Action (Final Rejection) dated Nov. 18, 2021 for U.S. Appl. No. 16/052,293 (pp. 1-18).

International Search Report and Written Opinion for application No. PCT/US20/062271 dated 26- Feb. 2021.

International Search Report and Written Opinion issued in PCT/US2020/062235, dated Mar. 10, 2021, 8 pages.

International Search Report and Written Opinion issued in PCT/US2020/062271, dated Feb. 26, 2021, 8 pages.

(56) References Cited

OTHER PUBLICATIONS

Ward, et al., "An exploration of the influence of path choice in game-theoretic attribuution algorithms," Journal of Machine Learning Research Under Review (2020), 21 pages.
Merrill, Douglas C, et al., "Systems and Methods for Decomposition of Non-Differentiable and Differentiable Models", U.S. Appl. No. 16/434,731, filed Jun. 7, 2019.
Merrill, John W. L. , et al., "Generalized Integrated Gradients: A practical method for explaining diverse ensembles", Journal of Machine Learning Research Under Review (2019).
Gehrlein, William et al., A two-stage least cost credit scoring model, 1997, Annals of Operations Research, pp. 159-171.
International Search Report and Written Opinion for International Application No. PCT/US18/030966, mailed Jul. 20, 2018.
International Search Report and Written Opinion of the ISA for application No. PCT/20/23370 dated 18-Jun. 2020.
International Search Report and the Written Opinion for Application No. PCT/US18/44874, mailed Oct. 10, 2018.
International Search Report and Written Opinion of the ISA, dated Jul. 5, 2019, for application No. PCT/US19/021381.
International Search Report and Written Opinion of the ISA, dated Sep. 16, 2019, for application No. PCT/US19/029148.
International Search Report and Written Opinion of the ISA, dated Aug. 23, 2019, for application No. PCT/US19/036049.
"ZestFinance releases new software tool to reduce bias in AI-powered credit scoring models: New fairness filter can put 170,000 more minority families into homes", Mar. 19, 2019, PR Newswire.
Abadi, Martin , et al., "TensorFlow: Large-Scale Machine Learning on Heterogeneous Distributed Systems", Preliminary White Paper, Nov. 9, 2015.
Breiman, Leo , et al., "Random Forests", Machine Learning, 45, 5-32, 2001.
Chen, Tianqi , et al., "XGBoost: A Scalable Tree Boosting System", KDD '16, Aug. 13-17, 2016, San Francisco, CA, USA.
Cortes, Corinna , et al., "Support-Vector Networks", AT&T Labs-Research, USA, Journal Machine Learning, vol. 20, Issue 3, Sep. 1995.
Friedman, Jerome H., "Greedy Function Approximation: A Gradient Boosting Machine", IMS 1999 Reitz Lecture, Feb. 24, 1999.
Garcia-Pedradas, Nicolas , et al., "Nonlinear Boosting Projections for Ensemble Contruction", Journal of Machine Learning Research 8 (2007) 1-33.
Geurts, Pierre , et al., "Extremely randomized trees", Springer Science + Business Media, Inc., rec'd Jun. 14, 2005, pub. online Mar. 2, 2006.
Johnson, Kristen , et al., "Artificial Intelligence, Machine Learning, and Bias in Finance: Toward Responsible Innovation", Fordham Law Review, Volume **, Issue 2, Article 5, 2019, pp. 499-529.
Kamkar, Sean Javad, "Mesh Adaption Strategies for Vortex-Dominated Flows", Standard University, Feb. 2011.
Lippert, John , "ZestFinance Issues small, high-rate loans, uses big data to weed out deadbeats", The Washington Post, Oct. 12, 2014.
Louppe, Gilles , et al., "Learning to Pivot with Adversarial Networks", 31st Conference on Neural Information Processing Systems (NIPS 2017), Long Beach, CA, USA, https://papers.nips.cc/paper/6699-learning-to-pivot-with-adversarial-networks.pdf.
Lundberg, Scott M., et al., "A Unified Approach to Interpreting Model Predictions", 31st Conference on Neural Information Processing Systems (NIPS 2017), Long Beach, CA, USA, Nov. 25, 2017.
Lundberg, Scott M., et al., "Consistent Individualized Feature Attribution for Tree Ensembles", University of Washington, Mar. 7, 2019.
Merrill, Douglas C, et al., "Systems and Methods for Enriching Modeling Tools and Infrastructure with Semantics", U.S. Appl. No. 16/394,651, filed Apr. 25, 2019.
Modarres, Ceena , et al., "Towards Explainable Deep Learning for Credit Lending: A Case Study", arXiv:1811.06471v2 [cs.LG], Nov. 30, 2018.
Nesiba, Reynold F., "The Color of Credit: Mortgage Discrimination, Research Methodology, and Fair-Lending Enforcement", Journal of Economic Issues, 37 (3), 813-815, 2003.
Richardson, L. F. , "The approximate arithmetical solution by finite differences of physical problems including differential equations, with an application to the stresses in a masonry dam", Philosophical Transactions of the Royal Society A. 210 (459-470): 307-357. doi:10.1098/rsta.1911.0009, Nov. 2, 1909.
Richardson, L. F. , "The deferred approach to the limit", Philosophical Transactions of the Royal Society A. 226 (636-646): 299-349. doi:10.1098/rsta.1927.0008, Oct. 14, 1926.
Rumelhart, David E., et al., "Learning representations by back-propagating errors", Nature vol. 323, Oct. 9, 1986.
Saabas, Ando , "Diving into data, A blog on machine learning, data mining and visualization, Interpreting random forests", http://blog.datadive.net/interpreting-random-forests/ (spec), Oct. 19, 2014.
Saabas, Ando , "Diving into data, A blog on machine learning, data mining and visualization, Random forest interpretation—conditional feature contributions", http://blog.datadive.net/random-forest-interpretation-conditional-feature-contributions/ (spec), Oct. 26, 2016.
Saabas, Ando , "Diving into data, A blog on machine learning, data mining and visualization, Random forest interpretation with scikit-learn", http://blog.datadive.net/random-forest-interpretation-with-scikit-learn/ (spec), Aug. 12, 2015.
Shapley, L. S. , "A Value for n-Person Games", p. 295, The Rand Corporation, Mar. 18, 1952.
Strumbelj, Eric , et al., "An Efficient Explanation of Individual Classifications using Game Theory", Journal of Machine Learning Research 11 (2010) 1-18.
Sundararajan, Mukund , et al., "Axiomatic Attribution for Deep Networks", Proceeding of the 34th International Conference on Machine Learning, Sydney, Australia, PMLR 70, Jun. 13, 2017.
Tonk, Stijn , "Towards fairness in ML with adversarial networks", http://godatadriven.com/, Apr. 27, 2019.
Wolpert, David H., "Stacked Generalization", Original contribution: Stacked generalization. Neural Netw., 5(2):241 {259, Feb. 1992.
Guanhong Tao et al., 2022. RULER: discriminative and iterative adversarial training for deep neural network fairness. Associate for Computing Machinery, New York, NY, USA, 1173-1184. https://doi.org/10.1145/3540250.3549169 (Year: 2002).
Y. Wang et al., "The Application Study of Credit Risk Model In Financial Institution via Machine-learning Algorithms," 2020 7th International Conference on Information Science and Control Engineering (ICISCE), Changsha, China, 2020, pp. 1419-1428 (Year: 2020).
Bean, D.M., Wu, H., Igbal, E., Dzahini, O., Ibrahim, Z.M., Broadbent, M., Stewart, R. and Dobson, R.J., 2017. Knowledge graph prediction of unknown adverse drug reactions and validation in electronic health records. Scientific reports, 7(1), pp. 1-11.
Office Action (Final Rejection) dated Aug. 16, 2022 for U.S. Appl. No. 15/977,105 (pp. 1-17).
Office Action (Non-Final Rejection) dated Aug. 1, 2022 for U.S. Appl. No. 16/052,293 (pp. 1-15).
Office Action (Non-Final Rejection) dated Aug. 26, 2022 for U.S. Appl. No. 16/394,651 (pp. 1-8).
Office Action (Non-Final Rejection) dated Sep. 15, 2022 for U.S. Appl. No. 17/535,511 (pp. 1-11).
Office Action (Non-Final Rejection) dated Sep. 22, 2022 for U.S. Appl. No. 17/223,698 (pp. 1-8).
Zhao, Q., Li, Q. and Wen, J., 2018. Construction and application research of knowledge graph in aviation risk field. In MATEC Web of Conferences (vol. 151, p. 05003). EDP Sciences.
Boris Sharchilev et al: "Finding Influential Training Samples for Gradient Boosted Decision Trees", arxiv.org, Cornell University Library, 201 Olin Library Cornell University Ithaca, NY 14853, Feb. 19, 2018 (Feb. 19, 2018), XP081223129, 10 pages.
European Extended Search Report issued in EP19764112.9, dated Jun. 27, 2022, 11 pages.
European Extended Search Report issued in EP19764112.9, dated Mar. 24, 2022, 14 pages.
Kang et al., "A novel credit scoring framework for auto loan using an imbalanced-learning-based reject inference". 2019 IEEE Con-

(56) References Cited

OTHER PUBLICATIONS ference on Computational Intelligence for Financial Engineering & Economics (CIFEr). May 4-5, 2019. DOI: 10.1109/CIFEr 2019. 8759110, 8 pages (Year: 2019).

Marco Ancona et al: "Towards better understanding of gradient-based attribution methods for Deep Neural Networks", arxiv.org, Cornell University Library, 201 Olin Library Cornell University Ithaca, NY 14853, Mar. 7, 2018 (Mar. 7, 2018), XP081506780, 16 pages.

Mukund Sundararajan et al: "Axiomatic Attribution for Deep Networks", arxiv.org, Cornell University Library, 201 Olin Library Cornell University Ithaca, NY 14853, Mar. 4, 2017 (Mar. 4, 2017), XP080754192, 10 pages.

Office Action (Non-Final Rejection) dated May 24, 2022 for U.S. Appl. No. 16/688,789 (pp. 1-17).

Office Action (Non-Final Rejection) dated Jun. 24, 2022 for U.S. Appl. No. 17/385,452 (pp. 1-14).

Wikipedia entry on "Autoencoder". https://en.wikipedia.org/wiki/Autoencoder Downloaded Jun. 15, 2022 (Year: 2022).

Dong Yue et al, "Threaded ensembles of autoencoders for stream learning : Neural Networks for Stream earning", Computational Intelligence, vol. 34, No. 1, doi:10.1111/coin.12146, ISSN 0824-7935, (Feb. 1, 2018), pp. 261-281, URL: https://api.wiley.com/onlinelibrary/tdm/v1/articles/10.1111%2Fcoin.12146, XP055925516 (Absract).

European Extended Search Report issued in EP19796824.1, dated Jun. 13, 2022, 9 pages.

International Preliminary Report on Patentability in International Appln. No. PCT/US2019/029148, dated Nov. 19, 2020, 6 pages.

Office Action (Final Rejection) dated Dec. 7, 2022 for U.S. Appl. No. 16/688,789 (pp. 1-24).

Office Action (Non-Final Rejection) dated Oct. 28, 2022 for U.S. Appl. No. 17/389,789 (pp. 1-19).

Wei Min et al, "Behavior Language Processing with Graph based Feature Generation for Fraud Detection in Online Lending Behavior Language Processing with Graph based Feature Generation for Fraud Detection in Online Lending", Proceedings of WSDM workshop on Misinformation and Misbehavior Mining on the Web, (Jan. 1, 2018), URL: https://web.archive.org/web/20180329125033if_/http://snap.stanford.edu:80/mis2/files/MIS2_paper_26.pdf, (Aug. 7, 2019), XP055611538, 8 pages.

\* cited by examiner

SYSTEMS AND METHODS FOR MODEL FAIRNESS

CROSS-REFERENCE TO RELATED APPLICATIONS

This application is a continuation of, and claims priority under 35 U.S.C. § 120 to, U.S. patent application Ser. No. 17/147,025, filed 12 Jan. 2021, which is a continuation of U.S. patent application Ser. No. 16/822,908 filed 18 Mar. 2020, now U.S. Pat. No. 10,977,729, which claims the benefit of U.S. Provisional Application No. 62/820,147, filed 18 Mar. 2019, the entire contents of each of which is fully incorporated herein by reference.

TECHNICAL FIELD

This invention relates generally to the modeling system field, and more specifically to a new and useful model training system in the modelling system field.

BACKGROUND

There is a need in the modeling system field to improve fairness in predictive models. In the field of credit risk modeling, where machine learning models are used to decide whether a consumer should be given a loan, it is particularly important that the lending decision be fair with respect to race and ethnicity, gender, age, and other protected attributes, that sources of disparate impact be identified, and either neutralized or justified. The Equal Credit Opportunity Act (ECOA), a United States law (codified at 15 U.S.C. § 1691 et seq.), enacted 28 Oct. 1974, provides a process to ensure fair credit decisions, and is incorporated by reference. Embodiments disclosed herein enable new and useful methods for creating more fair models, in general, and in particular, to create credit risk models in compliance with laws and regulations such as ECOA.

DESCRIPTION OF THE PREFERRED EMBODIMENTS

Figure 1A:
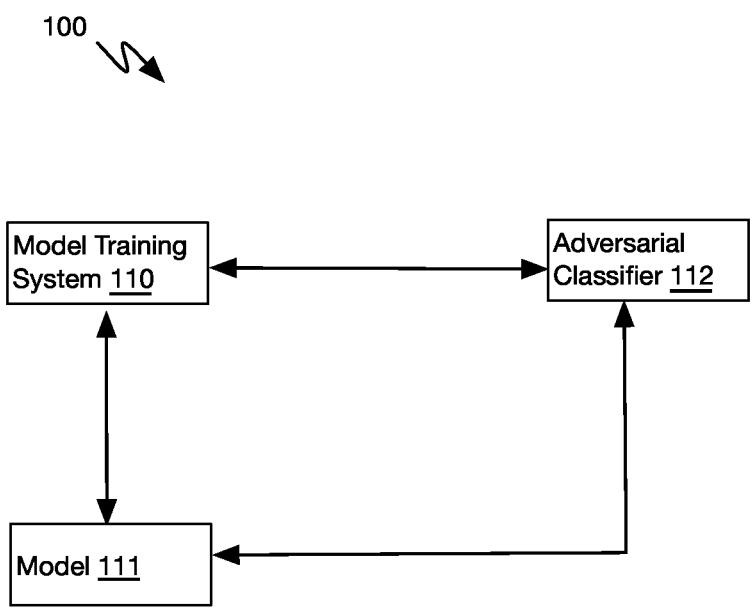
FIGS. 1A-C are schematic representations of systems, in accordance with embodiments.

The following description of the preferred embodiments is not intended to limit the disclosure to these preferred embodiments, but rather to enable any person skilled in the art to make and use such embodiments.

1. Overview

In determining whether to deploy a model (e.g., a predictive model) in a real-world scenario that impacts people's lives, fairness in how such a model impacts people's lives can be a consideration in determining whether to deploy the model, or continue model development. For example, whether a model favors a certain class of people (e.g., a class based on race, ethnicity, age, sex, national origin, sexual orientation, demographics, military status, etc.) over other classes of people may be a consideration in determining whether to deploy the model.

Fairness can also be a concern in deciding whether to deploy models that do not directly impact people's lives, or that do not affect people's lives at all. For example, for a predictive model that predicts a value related to efficacy of various drugs, it might be desired to train the model such that it does not favor drugs produced by a specific manufacturer. Several other examples exist in which it is useful to train a model to be fair with respect to a certain class of data sets.

Similarly, in many cases it is desirable to train a model such that it is invariant (at least within a degree) to changes in one or more selected features (e.g., sensitive attributes).

Embodiments herein address the foregoing by providing new and useful systems and methods of training a model.

In some variations, the system (e.g., 100) includes at least one of a model training system (e.g., 110), a model (e.g., 111), and an adversarial classifier (e.g., 112).

In some variations, the method (e.g., 200) includes at least one of: generating a model (e.g., S210); pre-training the model (e.g., S220); selecting suspect features (e.g., S230); pre-training an adversarial classifier (e.g., S240); evaluating the model by using the adversarial classifier (e.g., 250); generating a new model by using the adversarial classifier (e.g., S260); comparing the new model to a pre-existing model (e.g., S270); and providing a user interface (e.g., S280). In some variations, evaluating the model at S250 includes, predicting a value of one or more sensitive attributes associated with an input data set used by the model 111 (or 111a-d) to generate an output (e.g., a score, a prediction, etc.), by using the output generated by the model.

In some examples, the adversarial classifier can be trained to predict values of sensitive attributes, and the model can be trained minimize accuracy of sensitive attribute value perditions determined by the adversarial classifier 112.

In some variations, the method can be used to train any suitable type of model. In some variations, the method can be used to train a more fair model that is combined with the original model in an ensemble to produce a more fair outcome.

In some variations, the method can be used to train models that satisfy business constraints (e.g., credit decisioning business constraints, hiring business constraints, etc.)

Embodiments herein provide a practical application of adversarial training techniques that includes practical systems and methods for: performing adversarial training for various types of predictive models; adversarial training of the predictive model in accordance with model constraint parameters that specify one or more features whose presence in the model and/or values should not be changed during adversarial training; selection of an adversarial-trained model that better satisfies accuracy and fairness metrics; automatic generation of reports justifying selection of an adversarial-trained model for use in production; and an operator device user interface that displays fairness metrics, accuracy metrics, and economic projections for adversarial-trained models and that receives user input for parameters used during adversarial training. In some variations, the system (e.g., 110) provides a Software As A Service (SAAS) (e.g., via an application server 114) that allows an operator to perform adversarial training on a model provided by the operator, and providing the operator with an adversarial-trained model that meets specified fairness and accuracy constraints. In some variations the system (e.g., 110) generates reports describing the original model, the adversarial training process, the resulting model, and model analysis and comparisons such as: showing the difference in fairness and accuracy between the original model and the more fair alternative, the importance of each input variable in the original model and the more fair model, and other comparisons and analyses related to the original model and fair alternatives.

The adversarial training techniques described herein can be applied to models used to make predictions in which fairness is a factor for deciding whether to permit the model for use in production. The embodiments herein can be applied to predictive models for use in decisions related to: credit lending, residential leasing, insurance applications, hiring, employment, fraud detection, admissions (e.g., school admissions), scholarship awards, advertising, home sales, drug testing, scientific research, medical results analysis, and the like.

2. Benefits

Variations of this technology can afford several benefits and/or advantages.

First, by performing adversarial-training for various types of models, fairness of predictive models of various types can be improved.

Second, by virtue of providing a user interface (as described herein) for adversarial training of a model, usability can be improved in generation of more fair models.

Third, by virtue of automatic generation of model selection reports that include fairness and accuracy metrics, and economic projections (as described herein), decisions to deploy a model into production can be more easily justified.

Fourth, by performing adversarial training of logistic regression models (as described herein), existing logistic regression models can be retrained for improved fairness, without the need to migrate to neural network models.

Fifth, by performing adversarial training of tree models (as described herein), existing tree models can be retrained for improved fairness, without the need to migrate to neural network models.

Sixth, by performing adversarial training in accordance with specified model constraints, computational complexity and performance of adversarial training can be improved. Moreover, adversarial training can constrained to training of models that satisfy constraints for deploying the model into a production environment.

3. System

Various systems are disclosed herein. In some variations, the system can be any suitable type of system that uses one or more of artificial intelligence (AI), machine learning, predictive models, and the like. Example systems include credit systems, drug evaluation systems, college admissions systems, human resources systems, applicant screening systems, surveillance systems, law enforcement systems, military systems, military targeting systems, advertising systems, customer support systems, call center systems, payment systems, procurement systems, and the like. In some variations, the system functions to train one or more models. In some variations, the system functions to use one or more models to generate an output that can be used to make a decision, populate a report, trigger an action, and the like.

The system can be a local (e.g., on-premises) system, a cloud-based system, or any combination of local and cloud-based systems. The system can be a single-tenant system, a multi-tenant system, or a combination of single-tenant and multi-tenant components.

In some variations, the system (e.g., 100) (or a component of the system, e.g., the model training system 110) can be an on-premises modeling system, a cloud-based modeling system, or any combination of on-premises and cloud-based components. In some embodiments, the modeling system includes model development and model execution systems. In some embodiments, the model development system provides a graphical user interface (e.g., 115) which allows an operator (e.g., via 120) to access a programming environment and tools such as R or python, and contains libraries and tools which allow the operator to prepare, build, explain, verify, publish, and monitor machine learning models. In some embodiments, the model development system provides a graphical user interface (e.g., 115) which allows an operator (e.g., via 120) to access a model development workflow that guides a business user through the process of creating and analyzing a predictive model. In some embodiments, the model execution system provides tools and services that allow machine learning models to be published, verified, executed and monitored. In some embodiments, the modeling system includes tools that utilize a semantic layer that stores and provides data about variables, features, models and the modeling process. In some embodiments, the semantic layer is a knowledge graph stored in a repository. In some embodiments, the repository is a storage system. In some embodiments, the repository is included in a storage medium. In some embodiments, the storage system is a database or filesystem and the storage medium is a hard drive.

In some variations, the system is a model training system.

In other variations, the system includes a model training system.

In some variations, the system functions to train a model to reduce impact of one or more identified model attributes (inputs) on output values generated by the model (and optionally use the trained model). In some variations, the system can re-train the model based on information computed by using an adversarial classifier (e.g., adversarial classifier prediction loss information).

In some variations, the system (e.g., 100) includes one or more of: a model training system (e.g., 110), a model (e.g., 111), an adversarial classifier (e.g., 112), a data storage device (e.g., 113), an application server (e.g., 114), a user interface (e.g., 115), and an operator device (e.g., 120). In some variations, the components of the system can be arranged in any suitable fashion.

In some variations, the system includes an adversarial network. In some variations, the model (e.g., 111) and the adversarial classifier (e.g., 112) form an adversarial network in which the model 111 generates a prediction based on features included in an input data set, and the adversarial classifier 112 predicts a value for a sensitive attribute (associated with the input data set) based on the prediction. In some implementations the sensitive attribute is not available to the model 111. In some implementations, an alternative model is generated in which the alternative model's training objective is to increase the error rate of the adversarial classifier. In some implementations, adversarial training data (e.g., a data set that identifies historical model predictions and corresponding values for one or more sensitive attributes) serves as the initial training data for the adversarial classifier (e.g., at S240), and training the adversarial classifier includes presenting the adversarial classifier with samples from the adversarial training data, until the adversarial classifier achieves acceptable accuracy. In some variations, the model (e.g., 111) is pre-trained with an initial training data set (e.g., at S220) (e.g., at 262). After pre-training, both the model and the adversarial classifier can be adversarially trained (e.g., at S262 and S261, respectively). In some variations, one or more of the model and the adversarial classifier can be trained (e.g., at S262 and S261, respectively) by iteratively calculating a gradient of an objective function and reducing a value of at least one parameter of the model by an amount proportional to the calculated gradient (e.g., by performing a gradient decent process, or any other suitable process). In some variations, gradients computed during adversarial training (e.g., gradients for a gradient decent process) (e.g., at S261, S262) are computed by performing a process disclosed in U.S. application Ser. No. 16/688,789 (e.g., a generalized integrated gradients method, in some embodiments, using a Radon-Nikodym derivative and a Lebesgue measure). However, any suitable training process can be performed.

Figure 1B:
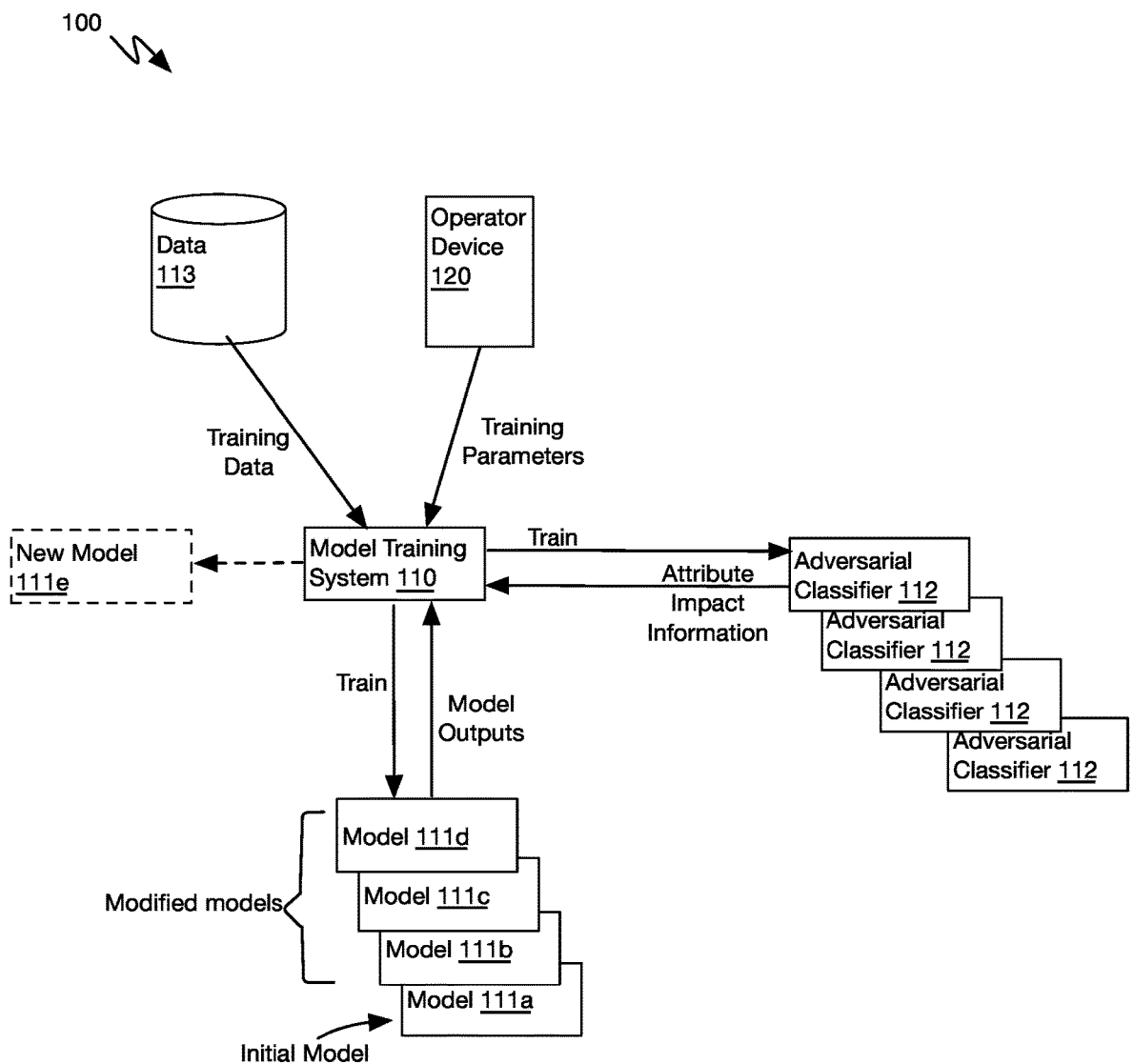
Figure 1C:
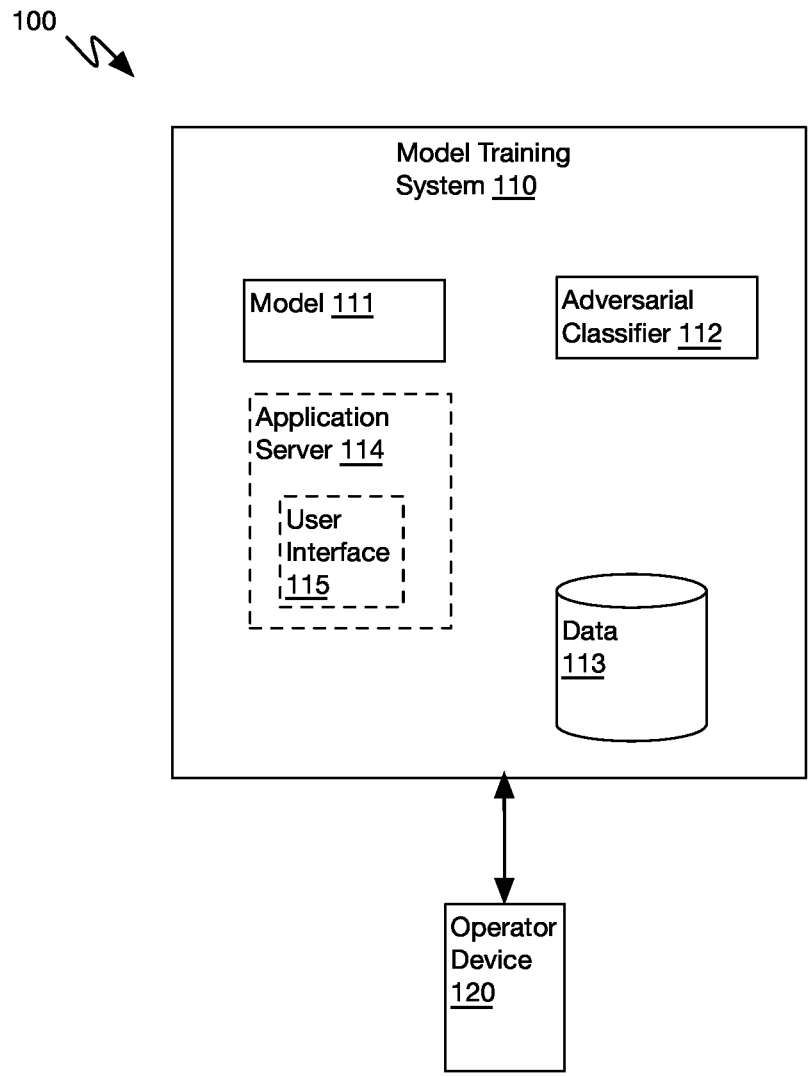

FIGS. 1A-C show exemplary systems 100 in accordance with variations.

The model training system 110 functions to train the model (e.g., 111) (e.g., pre-training, adversarial training, etc.). In some variations, the model training system 110 functions to train the model (e.g., 111) by using an adversarial classifier model (e.g., 112). The model training system can be any suitable type of model training system that uses data from the adversarial classifier 112 (e.g., data identifying a prediction loss of the adversarial classifier) to train a model. Example model training systems can include Python modelling systems, R modelling systems, and the like. In some variations, the model training system includes a training set selector that selects training data based on data received from the adversarial classifier 112. In some implementations, the training set selector removes attributes from the training set based on information received from the adversarial classifier (e.g., information identifying a prediction accuracy of the adversarial classifier for the removed attribute). In some implementations, the training set selector includes one or more rules that are used by the training selector to remove attributes from the training data sets based on the information received from the adversarial classifier. For example, if the adversarial classifier can accurately predict a value of a sensitive attribute from an output generated by the model, the model training system can remove the sensitive attribute from the training data used to train the model (e.g., 111).

In some variations, the adversarial classifier 112 functions to predict a value of one or more sensitive attributes associated with an input data set used by the model 111 (or 111a-d) to generate an output (e.g., a score, a prediction, etc.), by using the output generated by the model. For example, the adversarial classifier can be trained to determine whether a credit prediction output by the model 111 relates to a female credit applicant (in this example the sensitive attribute is "sex", and the value is one of "male" or "female").

In some variations, the input to the adversarial classifier is a model output and a sensitive attribute. In some variations, the sensitive attribute is a feature associated with each row in the training data for the pre-existing model (M) but not contained in the training data for the pre-existing model (M).

In some variations, the adversarial classifier is a machine learning model. However, the adversarial classifier can be any suitable type of system that can predict sensitive attribute values.

In some variations, the adversarial classifier 112 is a model that predicts sensitive attributes based on a model score of a model being evaluated (e.g., 111, 111a-d).

A sensitive attribute can be a feature that identifies a class of individuals (e.g., a class based on race, ethnicity, age, sex, national origin, sexual orientation, demographics, military status, etc.), a manufacturer of a product, or any type of information that should not affect output (e.g., a prediction) generated by the model. In some variations, a sensitive attribute need is not an input feature to the model (e.g., as is required, for example in fair lending applications wherein the applicant's protected class membership status is prohibited from being included as a model input variable). In some variations, the method disclosed herein provides a way to make the model more fair under the conditions required by ECOA and other fair lending regulation.

In some embodiments, a fair alternative model is trained simultaneously with the adversarial classifier. In some embodiments, the fair alternative model is trained on a subset of training rows, and then invoked to produce a score for each row, each score being evaluated by one or many adversarial classifiers each designed to predict a protected attribute or combination of attributes based on the fair alternative model score. In some embodiments the adversarial classifiers predict a protected attribute based on the model score. In some embodiments, the adversarial classifiers are trained simultaneously with the fair alternative model; the adversarial classifier is trained based on the fair alternative model score and a known protected attribute, each corresponding to the same row used to generate the score from the fair alternative model. In some embodiments, the error rate of the adversarial classifier is combined in the objective function of the fair alternative model after the initial training epoch, prior to updating the fair alternative model (through back propagation or other means), and the process continues by selecting successive samples of training data, training the fair alternative model, and training the adversarial classifier as described, until the training data is exhausted. In some embodiments, the objective function in the fair alternative model is a linear combination of the output of the model's original objective function and the error rate of the adversarial classifier(s). In some embodiments there is an adversarial classifier for each protected attribute. In other embodiments, there is one adversarial classifier predicting a binary flag representing all the protected attributes. In some variations the adversarial classifier is a neural network. In some variations the more fair alternative model is a neural network. In some variations, a series of more fair alternative models are produced by adjusting the linear combination of the fair alternative model's loss function and the adversarial model's accuracy. In some embodiments, the number of fair alternative models and the linear combination parameters are selected by a user operating a graphical user interface. In some embodiments each fair alternative model is analyzed and reports are generated to help a user determine whether each model produces stable results over time, produces the desired business results, and is otherwise suitable for use in production. In some embodiments, a best alternative model is selected using pre-defined selection criteria based on attributes of the model and the business problem.

In some variations, one or more of the components of the system are implemented as a hardware device that includes one or more of a processor (e.g., a CPU (central processing unit), GPU (graphics processing unit), NPU (neural processing unit), etc.), a display device, a memory, a storage device, an audible output device, an input device, an output device, and a communication interface. In some variations, one or more components included in hardware device are communicatively coupled via a bus. In some variations, one or more components included in the hardware system are communicatively coupled to an external system (e.g., an operator device 120) via the communication interface.

The communication interface functions to communicate data between the hardware system and another device (e.g., the operator device 120, a model execution system, etc.) via a network (e.g., a private network, a public network, the Internet, and the like).

In some variations, the storage device includes the machine-executable instructions of one or more of a model 111, an adversarial classifier 112, a user interface 115, an application server 114, and a training module that functions to perform at least a portion of the method 200 described herein.

In some variations, the storage device includes data 113. In some variations, the data 113 includes one or more of training data, outputs of the model 111, outputs of the adversarial classifier 112, accuracy metrics (as described herein), fairness metrics (as described herein), economic projections (as described herein) and the like.

The input device functions to receive user input. In some variations, the input device includes at least one of buttons and a touch screen input device (e.g., a capacitive touch input device).

4. Method

In some variations, the method functions to train at least one model (e.g., 111). In some variations, the method functions to train at least one model such that it is invariant (at least within a degree) to changes in one or more selected features (attributes).

In some variations, the method (e.g., 200) includes at least one of: generating a model (e.g., S210); pre-training the model (e.g., S220); selecting suspect features (e.g., S230); pre-training an adversarial classifier (e.g., S240); evaluating the model by using the adversarial classifier (e.g., 250); generating a new model by using the adversarial classifier (e.g., S260); comparing the new model to a pre-existing model (e.g., 270); and providing a user interface (e.g., S280). In some variations, S260 includes one or more of: re-training (e.g., adversarial training) the adversarial classifier (e.g., S261); modifying the model (e.g., adversarial training) (e.g., S262) (e.g., generated at S210); evaluating the modified model (e.g., S263); determining whether the modified model satisfies constraints (e.g., S264); and providing a new model (e.g., S265). In some variations, if constraints are not satisfied at S264, processing returns to S261, and another training iteration is performed. In some variations, if constraints are satisfied at S264, processing proceeds to S265. In some variations, evaluating the model at S263 includes predicting a value of one or more sensitive attributes associated with an input data set used by the model 111 (or 111a-d) to generate an output (e.g., a score, a prediction, etc.), by using the output generated by the model.

In some variations, at least one component of the system (e.g., 100 performs at least a portion of the method (e.g., 200).

Figure 2A:
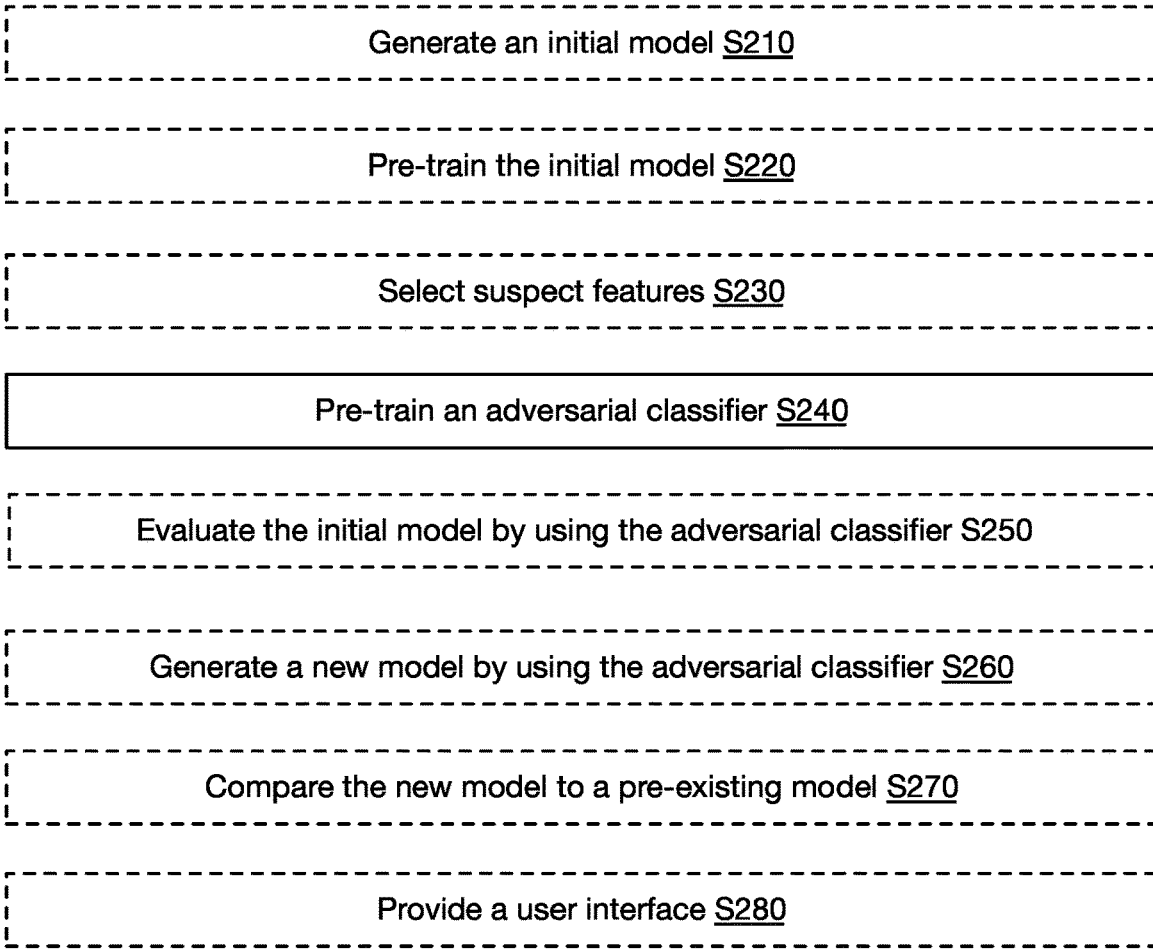
FIGS. 2A-B are schematic representations of methods, in accordance with embodiments.
Figure 2B:
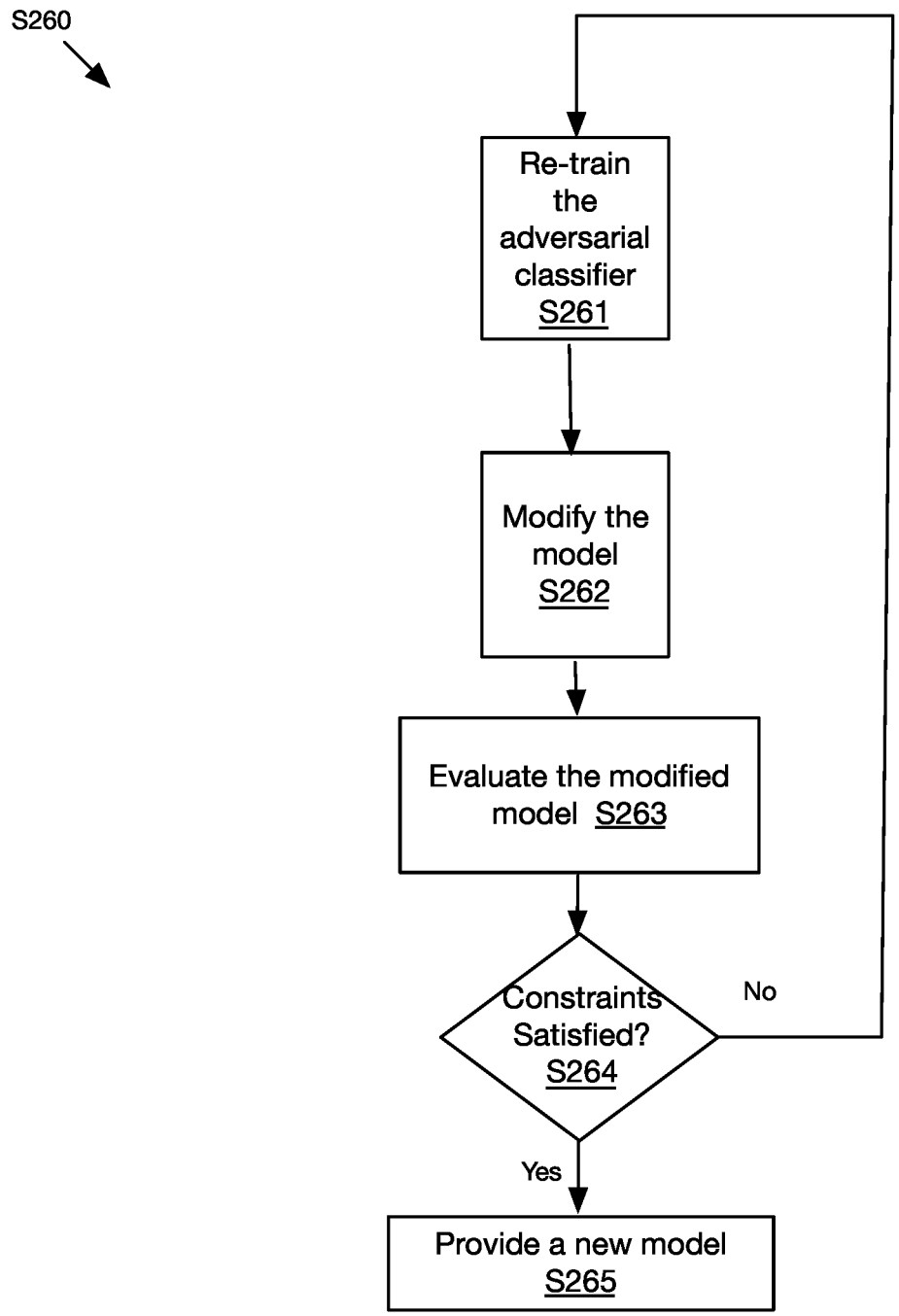

FIGS. 2A-B are representations of a method 200, according to variations.

In some variations, S210 functions to generate an initial model (e.g., 111a shown in FIG. 1B) to be evaluated at S250 by using an adversarial classifier (e.g., 112). In some variations, the initial model generated at S210 is modified (e.g., model parameters are modified to generate one or more new models 111b-d) at S260 (e.g., based on the evaluation at S250). In some implementations, generating the initial model includes defining the model (e.g., by using Python, R, a model development system, a text editor, a workflow tool, a web application, etc.).

The initial model (e.g., 111a) generated at S210 can be any suitable type of model (e.g., as shown in FIGS. 3-7, or any other suitable type of model). The initial model has an initial set of model parameters (e.g., weights, support vectors, coefficients, etc.) that can be adjusted (e.g., during adversarial training) at S260.

In some variations, the initial model 111a can include one or more of: a tree model, a logistic regression model, a perceptron, a feed-forward neural network, an autoencoder, a probabilistic network, a convolutional neural network, a radial basis function network, a multilayer perceptron, a deep neural network, or a recurrent neural network, including: Boltzman machines, echo state networks, long short-term memory (LSTM), hierarchical neural networks, stochastic neural networks, and other types of differentiable neural networks, or any suitable type of differentiable or non-differentiable model. In some variations, the initial model is a supervised learning model. In some variations, the initial model is a discriminative model. In some variations, the initial model is a predictive model. In some variations, the initial model is a model that functions to predict a label given an example of input variables.

In some variations, the initial model 111a is a single model.

In some variations, the initial model 111a is an ensemble model (e.g., heterogeneous, homogeneous) that performs ensembling by any one of a linear combination, a neural network, bagging, boosting, and stacking. In some variations, the initial model 111a is an ensemble that includes differentiable and non-differentiable models. However, the initial model can be any suitable type of ensemble.

The initial model 111a can be a credit model. However, in some variations, the initial model 111a can used for any suitable purpose, such as credit lending, residential leasing, insurance applications, hiring, employment, fraud detection, admissions (e.g., school admissions), scholarship awards, advertising, home sales, drug testing, scientific research, medical results analysis, and the like.

In some variations, the initial model 111a is a pre-existing model (M) (e.g., a credit model currently used in a production environment to generate credit scores).

In some variations, the initial model 111a is an alternative model (F) (e.g., a fair alternative) (e.g., an alternative model to a currently used credit model, etc.) that is an alternative to a pre-existing model (M), and F is trained based on input variables (x).

The alternative model (F) can be any suitable type of model. In some variations, the alternative model (F) includes one or more of a linear model, neural network, or any other differentiable model. In some variations, M and F are both differentiable models. In other variations, M and F are piecewise constant. In other variations M and F are piecewise differentiable. In other variations, M and F are ensembles of differentiable and non-differentiable models.

In some variations, the initial model 111a is an ensemble (E) that is trained based on input variables (x). The ensemble (E) can be any suitable type of ensemble. In some variations, the ensemble (E) includes one or more of a tree model and a linear model. In some variations, the ensemble (E) includes one or more of a tree model, a linear model, and a neural network model (either alone or in any suitable combination).

In an example, in the case of a pre-existing model (M) that does not have a gradient operator, or a model for which adversarial training is not directly applicable, an alternative model (F) is generated from the pre-existing model (M), such that the alternative model (F) is trainable by using the adversarial classifier 112. In a first example, a neural network model is generated from a logistic regression model, wherein the neural network is trained on the logistic regression model inputs x to predict the logistic regression model's score. In a second example, a neural network model is generated from a tree-based model, wherein the neural network is trained on the tree-based model inputs x to predict the tree-based model's score. Because these proxy models are differentiable it is possible to compute a gradient (e.g., of an objective function, etc.), which can be used during adversarial training (e.g., at S260) to adjust parameters of the proxy models.

In some variations, the initial model is piecewise differentiable. In such cases, and a gradient used during adversarial training (e.g., at S260) (to adjust parameters of the initial model) is computed using a generalized integrated gradients process (as disclosed herein), wherein the gradient is based on a Radon-Nikodym derivative and a Lebesgue measure. In some variations, the initial model is an ensemble of a continuous model and a piecewise constant model. In some variations, the initial model is an ensemble of a continuous model and a discontinuous model. In some variations, the ensemble function is a continuous function such as a neural network.

S210 can include accessing a pre-existing model (M), using the pre-existing model (M) to generate model output values for at least one set of the training data set, and training the alternative model (F) (e.g., 111a) to predict the model output values generated by the pre-existing model (M) based on the data sets (and features) used to train the pre-existing model (M). In this manner, the alternative model (F) is generated such that it predicts model outputs that would have been generated by the pre-existing model (M).

S210 can include: selecting a model type of the alternative model (F), wherein training the alternative model (F) includes training the alternative model (F) as a model of the selected model type. In some variations, the model type of the alternative model (F) is the same as the pre-existing model (M). In some variations, the model type is automatically selected. In some implementations, the model type is automatically selected based on a list of candidate model types and a set of optimization and selection criteria, in some variations, provided by an operator. In some variations, the optimization criteria includes a fairness metric and an accuracy metric (or a fairness and an economic metric), and selection criteria include thresholds set based on the optimization criteria applied to the original model, or any computable function on optimization criteria, such as the ratio of the fairness metric improvement and the decrease in profitability, economic criteria, demographic criteria, etc. In some variations, economic criteria includes one or more of: expected net profit from a loan, a value at risk calculation, a predefined economic scenario, etc. In some variations, demographic criteria includes one or more of: race, ethnicity, gender, age, military status, disabled status, marriage status, sexual orientation, geographic criteria, membership in a group, religion, political party, and any other suitable criteria. In some variations, the model type is selected based on received user input (e.g., via the operator device 120, the user interface 115, etc.). In some variations, the alternative model (F) is a neural network. In some variations, the alternative model (F) is an ensemble model. In some variations, the alternative model (F) is an XGBoost model. In some variations, the alternative model (F) is then evaluated at S250.

S210 can include recording a model type of the initial model.

In some variations, the method optionally includes S220, which functions to perform non-adversarial pre-training for an initial model (e.g., generated at S210, accessed from a storage device, etc.) on a training data set (e.g., a full training data set) for the model, to generate the historical model output values used to train (e.g., pre-train at S240) the adversarial classifier.

S220 can include accessing the initial model (e.g., 111a) from a storage device (e.g., 113) of the system 100. Alternatively, S220 can include accessing the initial model (e.g., 111) from a system external to the system 100.

In some variations, the method optionally includes S230, which functions to select suspect features. In some variations, S230 functions to select features that are known to be (or suspected to be) sensitive attributes for training the adversarial classifier 112. In some variations, the sensitive attributes are predetermined. In some variations, the sensitive attributes are dynamically selected during training. In some variations, information identifying sensitive attributes is received via a user input device (e.g., of the operator device 120). In some variations, information identifying the sensitive attributes is generated by using a model (e.g., a machine learning model, etc.). In some variations, the model (e.g., initial model) implements the BISG method as described in the Consumer Finance Protection Bureau publication, "Using publicly available information to proxy for unidentified race and ethnicity". In some variations, the sensitive attributes include at least one of: race, ethnicity, gender, age, military status, and a demographic attribute.

S240 functions to perform non-adversarial pre-training for an adversarial classifier (e.g., 112) that is used to evaluate the initial model (e.g., 111a). In some variations, S240 includes pre-training an adversarial classifier that predicts sensitive attribute values (for sensitive attributes) from model output generated by the pre-trained model (e.g., trained at S220, or otherwise pre-trained) (e.g., the initial model). In some variations, S240 includes pre-training an adversarial classifier that predicts values for each suspect feature selected at S230, from model output generated by the pre-trained model (e.g., trained at S220, or otherwise pre-trained) (e.g., the initial model).

In some variations, the adversarial classifier 112 is trained by using historical model output values generated by the initial model, and corresponding historical sensitive attribute values (for each historical model output value). In some variations, the historical model output values and corresponding sensitive attribute values are stored (e.g., stored in storage device 113).

In some variations, sensitive attribute values used to train the adversarial classifier 112 are included in (or associated with) the training data set used to pre-train the initial model. In some variations, sensitive attribute values used to train the adversarial classifier 112 (e.g., at S240) are not included in the training data set used to pre-train the initial model. In some variations, the sensitive attribute values used to train the adversarial classifier 112 are based on the training data set used to pre-train the initial model. In some variations, the sensitive attribute values used to train the adversarial classifier 112 are generated based on a machine learning model and the training data set used to pre-train the initial model.

In some variations, the sensitive attribute values that correspond to historical model output values are determined by performing the BISG method as described in the Consumer Finance Protection Bureau publication, "Using publicly available information to proxy for unidentified race and ethnicity". In some variations, the sensitive attribute values are provided by the direct report of the applicant or user. In some variations, the sensitive attribute values are computed using a predictive model. In some variations, the sensitive attribute values are retrieved from a database or web service.

In some variations, the models and analysis are run based on each protected attribute identification method, and based on various confidence thresholds of the protected attribute identification method outputs, considering each data set, in combination, to provide a thorough evolution of all the options.

In some variations, S250 functions to evaluate the initial model by using the adversarial classifier trained at S240. In some variations, S250 includes determining whether the initial model satisfies one or more constraints. In some variations, the constraints include fairness constraints. In some implementations, fairness constraints include prediction accuracy thresholds for one or more sensitive attributes whose values are predicted by the adversarial classifier based on outputs from the initial model, and the initial model satisfies the fairness constraints if prediction accuracy of the adversarial classifier 112 for the initial model are below one or more of the thresholds. However, the initial model can otherwise be evaluated by using the adversarial classifier 112.

In some variations, responsive to a determination at S250 that the initial model satisfies the constraints, the initial model is used in a production environment (e.g., provided to one or more of an operator device and a model execution system.).

In some variations, responsive to a determination at S250 that the initial model does not satisfy one or more constraints, a new model is generated (e.g., at S260).

In some variations, S260 functions to generate at least one new model (e.g., 111b-d) by using the adversarial classifier 112. In some implementations, the model training system 110 generates at least one new model. The new model can be a version of the initial model with new model parameters, a new model constructed by combining the initial model with one or more additional models in an ensemble, a new model constructed by adding one or more transformations to an output of the initial model, a new model having a different model type from the initial model, or any other suitable new model having a new construction and/or model parameters (examples shown in FIGS. 3-7).

In a first variation, at S260, the model training system 110 generates the new model by re-training the initial model (e.g., 111a) by performing an adversarial training process (e.g., at S262). In some implementations, re-training the initial model includes selecting a new set of model parameters for the new model.

In a second variation, at S260, the model training system 110 generates the new model based on the initial model (e.g., as shown in FIGS. 3-7), and initially trains the new model (or one or more sub-models of the new model) by using training data (e.g., by using the training data set used to pre-train the initial model at S220, another training data set, etc.). In some variations, after initially training the new model (that is based on the initial model), the new model is re-trained by performing an adversarial training process (e.g., at 262) (e.g., by selecting new model parameters for the new model). FIGS. 3-7 show examples of models that can be generated based on the initial model.

In a first example, the new model (e.g., shown in FIG. 4) includes a transformation (e.g., a smoothed approximate empirical cumulative distribution function (ECDF)) that transforms the distribution of output values of the initial model.

In a second example, the new model (e.g., shown in FIG. 5) is a compound model in which the outputs of the initial model and one or more submodels are ensembled together (e.g., using a simple linear stacking function).

In a third example, the new model (e.g., shown in FIG. 6) is a compound model in which the outputs of the initial model and one or more submodels are ensembled together (e.g., using a simple linear stacking function), and the distribution of output values of the ensemble is transformed (e.g., by a smoothed approximate empirical cumulative distribution function (ECDF)).

In a fourth example, the new model (e.g., shown in FIG. 7) is a compound model in which the outputs of the initial model and one or more submodels (and optionally the input data (base signals)) are ensembled together (e.g., using neural network stacking function), and the distribution of output values of the ensemble is transformed (e.g., by a smoothed approximate empirical cumulative distribution function (ECDF)).

In a fifth example, the new model (e.g., 111e) is a modified version (e.g., 111b-d) of the initial model (e.g., 111a) (e.g., a version of the initial model having different parameters).

In a sixth example, the new model (e.g., 111e) is an ensemble of a pre-existing model (M) and a modified version (F) (e.g., 111b-d) of the initial model (e.g., 111a). In some variations, M and F are both differentiable models. In some variations, M and F are piecewise constant. In some variations, M and F are piecewise differentiable. In some variations, the ensemble includes at least one differentiable model and at least one non-differentiable model. In a first example of the ensemble, the ensemble is a linear combination of F and M model outputs. In a second example of the ensemble, the ensemble is a composition of F and M (e.g., F(M(x), x)). However, any suitable ensemble of F and M can be generated as the new model (e.g., 111e).

In a seventh example, the initial model (e.g., 111a) is an ensemble (E), and generating the new model (e.g., 111e) includes learning a new model F(E(x), x) that maximizes the AUC (area under the curve) of E while minimizing the accuracy of the adversarial classifier 112. In some implementations, learning the new model includes constructing a model that generates an output based on 1) the input data x, and 2) an output generated by the ensemble from the input data x (e.g., E(x)); the new model F(E(x), x) (or one or more sub-models of F(E(x), x)) is trained by using training data (e.g., by using the training data set used to pre-train the initial model at S220, another training data set, etc.). In some variations, after initially training the new model F(E(x), x), the new model F(E(x), x) is re-trained by performing an adversarial training process (e.g., at 262) by selecting new model parameters for the new model F(E(x), x) (and E(x)) that maximize the AUC of E while minimizing the accuracy of the adversarial classifier 112.

In a seventh example, the initial model (e.g., 111a) is an ensemble (E), and generating the new model (e.g., 111e) includes learning a new model F(x) that includes E as a submodel, and combining F and E within an ensemble (FE) to produce a model score.

In some implementations, learning the new model F(x) includes initially training F(x) by using training data (e.g., by using the training data set used to pre-train the initial model at S220, another training data set, etc.); and after initially training the new model F(x), the new model F(x) is re-trained by selecting new model parameters for the new model F(x) (and E(x)) that maximize the AUC of E while minimizing the accuracy of the adversarial classifier 112.

In some variations, the ensemble FE is a linear combination (e.g., w*F(x)+(1−w)*E(x)). In some variations, the coefficients of the linear combination FE are determined based on a machine learning model (e.g., a ridge regression, etc.). In some variations, the ensemble FE is ensembled based on a neural network, including, without limitation: a perceptron, a multilayer perceptron, or a deep neural network, etc.

In some variations, the new model (e.g., 111e) has a model type that is different from a model type of a pre-existing model (M).

In some variations, the new model (e.g., 111e) has a model type that is the same as a model type of a pre-existing model (M). In some variations, the initial model has a model type that is different from a model type of a pre-existing model (M), and generating the new model includes generating a new model that corresponds an adversarial-trained model (e.g., 111b-d) (trained by using the adversarial classifier 112) and has the same model type as the pre-existing model (M). By virtue of generating a new model that has a same model type as the pre-existing model (M), existing systems and processes that depend on the model having the model type of the pre-existing model (M) can operate with the new model that has improved fairness in at least one aspect as compared to the pre-existing model (M).

In some variations, S260 includes performing adversarial training by iteratively training the adversarial classifier 112 and the model (e.g., 111a-d). In some variations, iteratively training the adversarial classifier and the model includes: during each of a plurality of iterations, first training the adversarial classifier 112 (e.g., by adjusting model parameters of the adversarial classifier to minimize a loss function for the adversarial classifier) for a single epoch while keeping the model (e.g., 111a) fixed (e.g., at S261), then training the model (e.g., 111b) (e.g., by adjusting model parameters of the model to minimize a loss function for the model) on one or more samples of the training data set (e.g., used to pre-train the model, e.g., 111a) while keeping the adversarial classifier fixed (e.g., at S262).

In some variations, adversarial training (e.g., S261, S262) includes iteratively adjusting parameters of the adversarial classifier and parameters of the model. In a first variation, adversarial training of a model (e.g., the model 111, the adversarial classifier (e.g., 112) includes increasing a value of one or more model parameters. In a second variation, adversarial training includes decreasing a value of one or more model parameters. In a third variation, adversarial training includes decreasing a value of one or more model parameters, and increasing a value of one or more model parameters.

In some variations, at least one model parameter is adjusted based on an objective function (e.g., a cost function, a loss function). In some variations, at least one model parameter is adjusted to decrease a value of the objective function (e.g., by decreasing the parameter based on a multiple of a value of the objective function).

In some variations, adjusting at least one model parameter includes determining at least one of a gradient and a derivative of the objective function. In some variations, at least one model parameter is adjusted to decrease a gradient of the objective function (e.g., by decreasing the parameter based on a multiple of a value of the gradient of the objective function). In some variations, at least one model parameter is adjusted to decrease a derivative of the objective function (e.g., by decreasing the parameter based on a multiple of a value of the derivative of the objective function).

In some variations, for the model (e.g., 111) the objective function is computed based on the current model parameters for the model (e.g., $W_f$) and the current parameters for the adversarial classifier (e.g., $W_a$).

In some variations, for the model (e.g., 111) the objective function is a difference between a model prediction loss metric for the model (e.g., 111) and an adversarial classifier prediction loss metric for the adversarial classifier 112 (e.g., $Loss_y - Loss_z$). In some variations, for the model (e.g., 111) the objective function is a difference between a model prediction loss metric for the model (e.g., 111) and a multiple (e.g., L) of the adversarial classifier prediction loss metric for the adversarial classifier 112 (e.g., $Loss_y - L*Loss_z$). In some implementations, L is a parameter that specifies the tradeoff between fairness and accuracy, as a higher value of L steers the model towards more fair predictions, while sacrificing prediction accuracy. In some variations, the prediction loss metric for the model is a difference between an actual target value and a target value predicted by the model using a sample of training data and the current model parameters for the model (e.g., $W_f$). In some variations, the prediction loss metric for the adversarial classifier is a difference between an actual sensitive attribute value and a sensitive attribute value predicted by the adversarial classifier using an output of the model (e.g., 111) and the current model parameters for the adversarial classifier (e.g., $W_a$).

In some variations, for the adversarial classifier (e.g., 112) the objective function is the adversarial classifier's prediction loss metric for the adversarial classifier 112 (e.g., $Loss_z$). In some variations, the prediction loss metric for the adversarial classifier is computed based on the current model parameters for the adversarial classifier (e.g., $W_a$). In some variations, the prediction loss metric for the adversarial classifier is a difference between an actual sensitive attribute value and a sensitive attribute value predicted by the adversarial classifier using an output of the model (e.g., 111) and the current model parameters for the adversarial classifier (e.g., $W_a$).

In some variations, adjusting at least one model parameter includes determining at least one of a gradient and a derivative of one or more of the model and the adversarial classifier.

In some variations, adjusting model parameters W (e.g., $W_f$, $W_a$) of the model or the adversarial classifier includes: calculating the gradients G of the objective function J(W); updating the parameters W by an amount proportional to the gradients G (e.g., W=W−nG, wherein n is the learning rate); and repeating until a stopping condition is met (e.g., the value of the objective function J(W) stops reducing).

In some variations, the gradient G of the objective function J(W) is computed by using one or more of a gradient operator of the model and a gradient operator of the adversarial classifier. In some variations, gradient G of the objective function J(W) is computed by performing a process disclosed in U.S. application Ser. No. 16/688,789 (e.g., a generalized integrated gradients method, in some embodiments, using a Radon-Nikodym derivative and a Lebesgue measure). In some variations, gradient G of the objective function J(W) is computed by: identifying a reference input data set; identifying a path between the reference input data set and an evaluation input data set (e.g., a current sample of the training data set, a current output of the model 111, etc.); identifying boundary points (e.g., points at which discontinuities of the objective function occur) of the objective function J(W) (e.g., discontinuities of the objective function) along the path by using model access information obtained for at least one of the model and the adversarial classifier; identifying a plurality of path segments by segmenting the path at each identified boundary point; for each segment, determining a segment contribution value for each feature of the sample by determining an integral of a gradient for the objective function along the segment; for each boundary point, determining a boundary point contribution value for the boundary point, and assigning the boundary point contribution value to at least one of the features of the input space; for each endpoint of the path between the reference input data set and the sample, assigning a contribution of each feature at the endpoint; and for each feature, combining the feature's segment contribution values and any boundary point and endpoint contribution values assigned to the feature to generate the feature contribution value for the feature with respect to at least two data points, wherein the gradient is G of the objective function J(W) is the set of feature contribution values. In some implementations, a Radon-Nikodym derivative and a Lebesgue measure are used to determine the integral of a gradient for the objective function along each segment. In some variations, the gradient is the gradient of a neural network model.

In some variations, when computing the gradient (for the model 111) for each sample of the training data set, a zero vector is selected as the reference input data set for the first sample; for each subsequent sample, a previous sample is used as the reference input data set. In some variations, the reference data set is previously used sample. In some variations, the reference data set is a randomly selected sample of the training data set. In some variations, the reference data set is a data set with one or more randomly generated values. However, the reference input data set for the model 111 can be identified by using any suitable process.

In some variations, when computing the gradient (for the adversarial classifier 112) for each model output, a zero vector is selected as the reference input data set for the first model output; for each subsequent model output, a previous model output is used as the reference input data set. In some variations, the reference data set is a randomly selected sample of the model outputs. In some variations, the reference data set is a data set with one or more randomly generated values. However, the reference input data set for the adversarial classifier can be identified by using any suitable process.

In some variations, any suitable type of process can be used to determine the integral of the gradient for the objective function.

In some variations, the adversarial classifier and the model are iteratively trained for each selected sensitive attribute (e.g., selected at S230). In some variations, sensitive attributes are combined into a single feature that characterizes any subset feature (such as, for example, by computing the logical OR of a set of protected class membership statuses).

In some variations, the adversarial classifier and the model are iteratively trained (e.g., at S260) in accordance with model constraint parameters.

In some variations, the model constraint parameters specify features whose model parameters are to be unchanged during the adversarial training process (e.g., at S260). For example, the search of a new model can be constrained by specifying features whose parameters are not to be changed. In some variations, model constraint parameters specify features whose parameters are to be unchanged during the training process (e.g., at S220, S262). In some variations, model constraint parameters specify features that are to remain in the model during the training process (e.g., features whose parameters should have a parameter value greater than zero). In some variations, model constraint parameters specify features that are not to be added to the model during the training process (e.g., features whose parameter values are to remain zero). In this manner, the search space for a new model can be reduced, thereby reducing computational complexity and achieving the desired business outcome. In some variations, the constraint parameters specify features for which the model score should move monotonically with respect to the feature value. Monotonic constraints enable a model to achieve specific business outcomes, such as preventing a model score from decreasing when a core credit attribute improves. In this manner, model constraints can be set such that the training does not result in a new model that deviates from specified model constraints. Model constraints can limit adversarial training to produce trained models that meet model constraints for models to be used in a production environment, such that models unsuitable for a production environment are not trained during adversarial training.

In some variations, the model training process (e.g., 262) applies sample parameters (e.g., weights, support vectors, coefficients, etc.). In some embodiments, the sample weights are based on a temporal attribute. In other variations, the sample weights correspond 1-1 with each training data row, and are provided in a file. In some variations, the sample weights are provided in a user interface. In some variations, the user interface is comprised of an interactive tool that enables the analysis of outcomes based on a user-selected and configurable: demographic criteria, model accuracy or economic criteria, sample weights, data files, and analysis and reporting templates. However, the analysis of outcomes can otherwise be performed.

In some variations, S263 includes computing an objective function used (e.g., at S262) to modify parameters for the model 111. In some variations, S263 includes computing an objective function used (e.g., at S261) to modify parameters for the adversarial classifier 112.

In some variations, S263 includes computing at least one accuracy metric (e.g., used by an objective function used to modify parameters for one or more of the model 111 and the adversarial classifier 112) for each training iteration. Accuracy metrics can include one or more of Area-Under-the-Curve (AUC) metrics, gini, KS, F1 score, and other accuracy values and statistics relating to the predictive accuracy of model outputs generated by the trained model (e.g., 111) and/or the adversarial classifier 112. In some variations, S263 includes updating each accuracy metric during each new training iteration. In some variations, the accuracy metric is selected by an operator from a user interface providing analysis capabilities to an analyst. In some variations, the accuracy metric is a function provided by an operator, including an economic projection of approved loan profitability based on a credit policy, or other computable function.

In some variations, S263 includes computing at least one fairness metric for each training iteration. Fairness metrics can include a correct prediction percentage for at least one sensitive attribute relating to sensitive attribute predictions generated by the adversarial classifier (e.g., 112). In some variations, S263 includes updating each fairness metric during each new training iteration. In some variations, the fairness metric is the EEOC fairness ratio, given by the percentage of approvals for a protected class divided by the percentage of approvals for the unprotected class. In some variations, the fairness metric is a fairness metric described in The U.S. Equal Employment Opportunity Commission, FEDERAL REGISTER,/VOL. 44, NO. 43/FRIDAY, Mar. 2, 1979 [6570-06-M], the contents of which is hereby incorporated by reference.

S263 can include recording final accuracy and fairness metrics for the adversarial-trained model (e.g., 111) (e.g., the model provided at S265).

S263 can include recording model metadata for the adversarial-trained model (e.g., 111) (e.g., generated at one or more of steps S210, S220, S230, S240, S250, S261 to S265). Model metadata for the adversarial-trained model can include features used by the model, information identifying training data used to train the model, model constraint parameters used during training of the model, model parameters, sample weights, selected metrics, analysis and reporting templates, and the like.

In some variations, S260 is performed for a plurality of fairness-versus-accuracy parameter (L) values (e.g., used in the objective function to modify parameters for the model 111) for at least one sensitive attribute, and final accuracy and fairness metrics are recorded for each iteration of S260, and the final accuracy and fairness metrics (e.g., determined at S263) are stored in association with the respective versions of the adversarial-trained model. In some variations, the plurality of analyses are performed on a compute cluster. In some variations, the plurality of analyses are distributed within a cloud computing environment. In some variations, cloud computing resources are deployed based on a policy, such as: as fast as possible/unlimited budget and budgeted. S260 can include recording model metadata for each adversarial-trained model (e.g., 111), as described herein. In this manner, several adversarial-trained models are generated, each one being generated with a different fairness-versus-accuracy parameter (L) value.

In some variations, an efficient selection of L is determined based on a gradient and a common search algorithm.

S265 can include selecting one of a plurality of adversarial-trained models based on final accuracy and fairness metrics stored in association with the plurality of adversarial-trained models. In some variations, a single model is automatically selected based on received user input (e.g., received via the operator device 120, the user interface 115, etc.). In some variations, a single model is automatically selected based on predetermined model selection criteria and the recorded accuracy and fairness metrics. In some variations, selection criteria includes at least one of an accuracy threshold, and a fairness threshold for at least one sensitive attribute.

In some variations, automatic selection includes automatic generation of a selection report that includes at least the recorded accuracy and fairness metrics for the selected model. In some variations, automatic selection includes automatic generation of a selection report that includes recorded accuracy and fairness metrics for each adversarial-trained selected model. In some variations, the system 100 (e.g., using 110) provides the selection report to the operator device. In this manner, an operator is notified of the selected model, fairness and accuracy metrics for the selected model, and fairness and accuracy metrics for models not selected. In some variations, the report includes an economic analysis including a comparison of profitability metrics such as loan losses and interest collected for a plurality of model variations. By virtue of providing this information, an operator can be notified of information justifying selection of the selected model. In some variations, the selection report also includes fairness-versus-accuracy parameter (L) values for each model. In some variations, the selection report includes model input contributions, quantifying the influence of a model input variable on the model's decisions overall and for each protected class, for any model in the analysis. In some variations the selection report includes the contribution of two-way or n-way combinations of input variables, for any model in the analysis. In some variations, the selection report includes a histogram of adverse action reason codes or model explanations for each alternative model. In some variations, the selection report includes partial dependence plots, ICE plots, and other charts showing the influence of each model input variable over a range of values, with respect to each model and disaggregated by protected attribute.

In some variations, S265 includes: accessing the adversarial-trained model (e.g., 111a-d), using the adversarial-trained model to generate model output values for a training data set, and training a new model to predict the model output values generated by the adversarial-trained model based on the data sets (and features) used to train the adversarial-trained model. In this manner, a new model is generated that predicts model outputs that would have been generated by the adversarial-trained model. In some variations, the model type of the new model is a model type recorded for the initial model (e.g., 111a) (e.g., at S210). S265 can include: selecting a model type of the new model, wherein training the new model includes training the new model as a model of the selected model type. In some variations, the model type is automatically selected. In some variations, the model type is selected based on received user input. In some variations, the new model is a logistic regression model. In some variations, the new model is a neural network model. In some variations, the new model is tree model. In some variations, the new model is a non-differentiable model.

S270 functions to compare the new model (e.g., generated at S260) with a pre-existing model (M). In some embodiments, the system 100 compares (e.g., by using the model training system 110) the new model generated at S260 with the pre-existing model (M) based on a model decomposition. Model decomposition is described in U.S. application Ser. No. 16/297,099 ("SYSTEMS AND METHODS FOR PROVIDING MACHINE LEARNING MODEL EVALUATION BY USING DECOMPOSITION"), filed, 8 Mar. 2019, Ser. No. 16/434,731 ("SYSTEMS AND METHODS FOR DECOMPOSITION OF NON-DIFFERENTIABLE AND DIFFERENTIABLE MODELS"), filed 7 Jun. 2019, and Ser. No. 16/688,789 ("SYSTEMS AND METHODS FOR DECOMPOSITION OF DIFFERENTIABLE AND NON-DIFFERENTIABLE MODELS"), filed 19 Nov. 2019, the contents of each of which are incorporated by reference herein. However, any suitable type of model decomposition can be used. By combining the adversarial training method to produce fair alternative models with model decomposition, the disclosed embodiments provide new and useful reports that explain why the new model, generated during the adversarial training process, is more fair than the pre-existing model. In some variations, the explained model report includes a comparison of the fair model with the original model. In some variations, the comparison includes the contributions of a model input variable to the model score with respect to a baseline population. In some variations, the baseline population is the set of approved loans. In some variations, the baseline population is a random sample. In some variations, the baseline population is selected based on a demographic criteria. In some variations, the baseline population is selected based on a demographic criteria and an economic criteria. In some variations, the baseline population is selected based on attributes provided by an operator in a user interface. In some variations the feature contributions are reported for each model overall, in other variations the feature contributions are reported for each sensitive attribute.

In some variations the comparison includes an economic comparison. In some embodiments the economic comparison includes an approval rate comparison, a default rate comparison, and an annual loss projection. In some variations the comparison is disaggregated based on a demographic attribute or a sensitive attribute. In some variations, the comparison is disaggregated based on a user selection of an attribute in a user interface.

S280 functions to provide a user interface (e.g., 115). In some variations, the user interface includes the selection report. In some variations, the user interface is a graphical user interface. In some variations, the user interface is provided by an application server (e.g., 114 shown in FIG. 1C). In some variations, the user interface displays information for each adversarial-trained model trained by the system 110. In some variations, information for an adversarial-trained model includes: model metadata (as described herein), accuracy metrics, fairness metrics, and the like. In some variations, the user interface includes a user-input element for receiving user-selection of at least one of: an adversarial-trained model trained by the system 110; a fairness-versus-accuracy parameter (L); a sensitive attribute; a model to be trained by the adversarial classifier; the model type for the output model; the model type for the model to be trained by the system 110; the model selection criteria; information identifying one or more features that are to be unchanged during adversarial training; model constraint parameters, and any other suitable information.

By virtue of the displayed user interface, an operator of the operator device (e.g., 120) can determine whether an adversarial-trained model satisfies fairness and accuracy requirements, as well as other model constraints and/or business requirements.

In some variations, the user interface displays information for the original model (e.g., model metadata, model type, features used, etc.). In this manner, newly trained models can be compared to the original model. In some variations, the user interface displays features used by the original model and features used by each adversarial-trained model.

In some variations, the system produces reports that document the analysis and model selection process in order to enable compliance with ECOA. In some embodiments the system produces reports that document the analysis and model selection process in order to enable compliance with other regulations including, GDPR, GLBR, FCRA, and other regulations, as required or recommended by the municipal, county, state, regional, national or international levels, without limitation. In some variations, the system produces reports that enable enterprise risk managers, governance bodies, auditors, regulators, judges and juries to assess model risk, the risk of unfair outcomes from the adoption of models, and to audit the process businesses use to measure and mitigate algorithmic bias.

In a first example, the method includes: preparing an initial model F (e.g., at S210), a fair alternative model to the pre-existing model (M), and training F (e.g., S262) based on input variables x and an adversary A (e.g., the adversarial classifier 112), wherein A is a model that predicts the sensitive attribute based on model F's score, and wherein the alternative model F includes one or more of a linear model, neural network, or any other differentiable model, and wherein the model F is a replacement to the pre-existing model (M).

In a second example, the method includes: preparing an initial model F (e.g., at S210), a fair alternative model to the pre-existing model (M), training F (e.g., S262) based on variables x and an adversary A, wherein A is a model that predicts the sensitive attribute based on model F's score, wherein the alternative model F includes one or more of a linear model, neural network, or any other differentiable model; and the new model generated by S260 is an ensemble of F and M, such as a linear combination of F and M model scores.

In a third example, the method includes: preparing an initial model F (e.g., at S210), a fair alternative model to the pre-existing model (M), training F (e.g., S262) based on variables x and an adversary A, wherein A is a model that predicts the sensitive attribute based on model F's score, wherein the alternative model F includes one or more of a linear model, neural network, or any other differentiable model, wherein the new model generated by S260 is an ensemble of F and M, such as a composition of F and M, e.g., F(M(x), x). In some variations, M and F are both differentiable models. In other variations, M and F are piecewise constant. In other variations M and F are piecewise differentiable. In other variations, M and F are ensembles of differentiable and non-differentiable models. In some variations, the gradient used in adversarial training is computed based on the generalized integrated gradients decomposition method described in U.S. application Ser. No. 16/688,789 ("SYSTEMS AND METHODS FOR DECOMPOSITION OF DIFFERENTIABLE AND NON-DIFFERENTIABLE MODELS"), filed 19 Nov. 2019, the contents of which is incorporated by reference herein. In some variations, the gradient used in adversarial training is accessed directly from the model (for example by accessing the gradient in a neural network).

In a fourth example, the method includes: preparing an ensemble model (E) (e.g., at S210), training E (e.g., at S220, S262) based on input variables x, wherein the ensemble model E is at least one of a tree model and a linear model; preparing an adversarial model (A) to be trained to predict the sensitive attribute based on the score generated by E (e.g., at S240); and learning the model F(E(x), x) (e.g., at S260) which maximizes the AUC (Area Under the Curve) of E while minimizing the accuracy of A, wherein x are the input features, based on the adversarial training method (e.g., the method 200) described herein.

In a fifth example, the method includes: preparing an ensemble model (E) (e.g., at S210), training E (e.g., at S220, S262) based on input variables x, wherein the ensemble model E is at least one of a tree model and a linear model; preparing an adversarial model (A) to be trained to predict the sensitive attribute based on the score generated by E (e.g., at S240); wherein S260 includes (1) learning a third model F(x), wherein F minimizes the accuracy of A, and maximizes the AUC of E, and (2) combining F and E within an ensemble (FE) to produce a model score that is more fair than the pre-existing model (M). In some variations, the ensemble FE is a linear combination (e.g., $w*F(x)+(1-w)*(x)$). In some variations, the coefficients of the linear combination FE are determined based on a machine learning model. In some variations, the ensemble FE is ensembled based on a neural network, including, without limitation: a perceptron, a multilayer perceptron, or a deep neural network. In some embodiments the gradient required for adversarial training is computed using generalized integrated gradients. In some embodiments, the gradient is retrieved from the model or computed based on the model parameters.

In a sixth example, the method includes: preparing an ensemble model (E) (e.g., at S210), training E (e.g., at S220, S262) based on input variables x, wherein the ensemble model E is at least one of a tree model, a neural network model, a linear model and combination thereof; preparing an adversarial model (A), a model trained to predict the sensitive attribute based on the score generated by E (e.g., at S240); wherein S260 includes: (1) learning a third model F(x), wherein F minimizes the accuracy of A, and maximizes the AUC of E, and (2) combining F and E within an ensemble (FE) to produce a model score that is more fair than the pre-existing model (M). In some variations, the ensemble FE is a linear combination (e.g., w*F(x)+(1−w)*E(x)). In some variations, the coefficients of the linear combination FE are determined based on a machine learning model, including, for example, a ridge regression. In some variations, the ensemble FE is computed based on a neural network, including, without limitation: a perceptron, a multilayer perceptron, or a deep neural network.

In some variations, the initial model (e.g., generated at S210, pre-trained at S220, etc.), or any new model generated at S260, can be any ensemble model which can be separated into two parts, a discontinuous sub-model, d(x), and a continuous model of the form f(x, d(x)) including both the elements of the input space directly and indirectly through the discontinuous model. In some variations, even if f( ) is itself continuous and possibly well-behaved, the composition of f( ) with d( ) might not be continuous if d( ) itself is not continuous. Schematics of several such models are shown in FIGS. 3-7. In some embodiments analysis of models including feature importances is computed by performing a process disclosed in U.S. application Ser. No. 16/688,789, (the generalized integrated gradients method).

Figure 3:
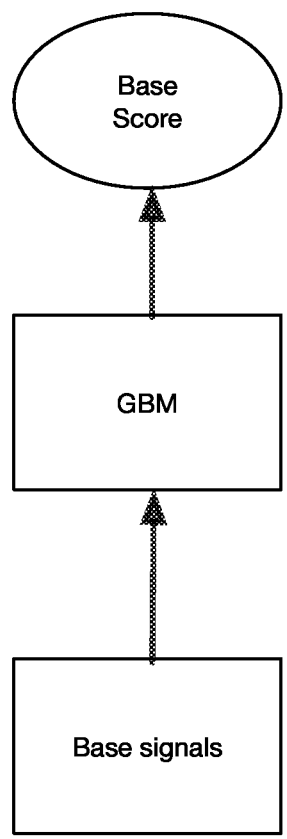
FIGS. 3-7 are representations of models, in accordance with embodiments.

FIG. 3 shows a pass-through model in which a collection of base features or "signals" is passed through a gradient boosted tree forest (GBM) and the result of that operation presented as a score. In some variations, the model f( ) shown in FIG. 3 can be represented as f(x,y), where f(x,y) is the identify function of y, and y is represented as d(x), which is the gradient boosted tree model. In some variations, f(x,y) itself is well-behaved. as it is just the identity on one variable, but the resulting ensemble model is discontinuous and ill-behaved, at least when considered as a machine learning model.

Figure 4:
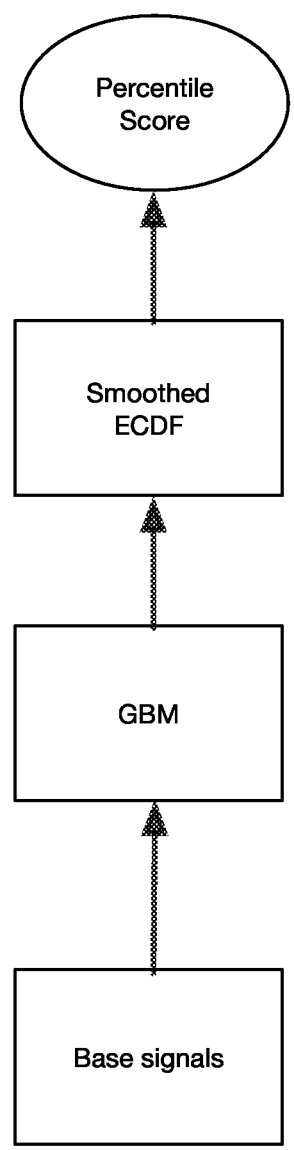

FIG. 4 shows a pass-through model in which the output of a GBM is then subsequently transformed through a "Smoothed approximate ECDF". An empirical cumulative distribution function (ECDF) is a function which, among other things, transforms the distribution of output values of a function in such a way that the fraction of items with values below a certain level in the ECDF is exactly that level: that is, if E is the ECDF associated with a model function f, then exactly 10% of all inputs will be such that E(f(x))<0.1, 20% will be such that E(f(x))<0.2, etc. A Smoothed approximate ECDF, S, is a continuous function which closely approximates a real ECDF but is continuous and almost everywhere differentiable. That is, almost exactly 10% of all inputs will be such that S(f(x))<0.1, 20% will be such that S(f(x))<0.2, etc. In some implementations, the ECDF's are not continuous, much less differentiable, but one can build a smooth approximate ECDF which arbitrarily closely approximates the original ECDF by the standard expedient of approximating the ECDF with any suitable technique. In some variations, this technique is at least one of: a piecewise linear approximation, a polynomial interpolant, a monotone cubic spline, the output of a general additive model, etc.

By composing the output of a GBM through a smoothed ECDF, S, one obtains a model of the form f(x, d(x))=S(d(x)), which meets the functional requirement for the Generalized integrated gradients decomposition method described herein. This modified form is useful, however, as lenders or other underwriters usually wish to approve only a fixed percentage of loans and such a transformation through a smoothed ECDF makes this possible. The methods described herein, however, are the first methods to correctly provide explanation information for ensemble models of this type.

Figure 5:
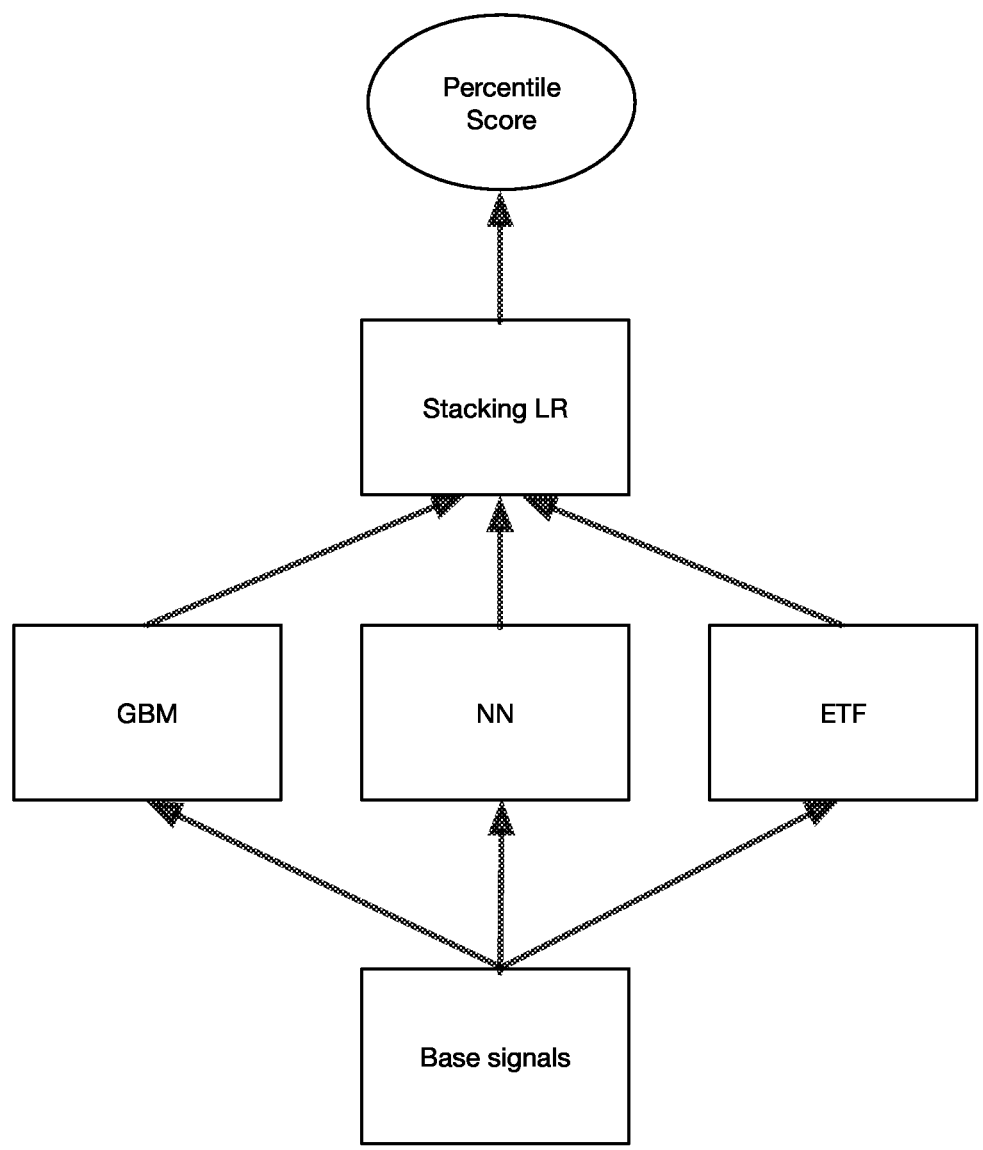

FIG. 5 displays a compound model in which the outputs of three submodels, a GBM, a neural network (NN), and an Extremely Random Forest (ETF) are ensembled together using a simple linear stacking function. Such ensembles provide very powerful machine learning models and are used frequently in machine learning models. Such a model can be presented in the form f(n(x), g(x), e(x)), where f denotes the final linear ensembling function, n denotes the continuous output of the neutral network submodel, g denotes the discontinuous output of the GBM, and e denotes the discontinuous output of the ETF. Despite the apparent difference in formalism, such models can be seen to be of the form to which the Generalized Integrated Gradients decomposition method (described in U.S. application Ser. No. 16/688,789, "SYSTEMS AND METHODS FOR DECOMPOSITION OF DIFFERENTIABLE AND NON-DIFFERENTIABLE MODELS", filed 19 Nov. 2019, the contents of which is incorporated by reference herein) applies.

Figure 6:
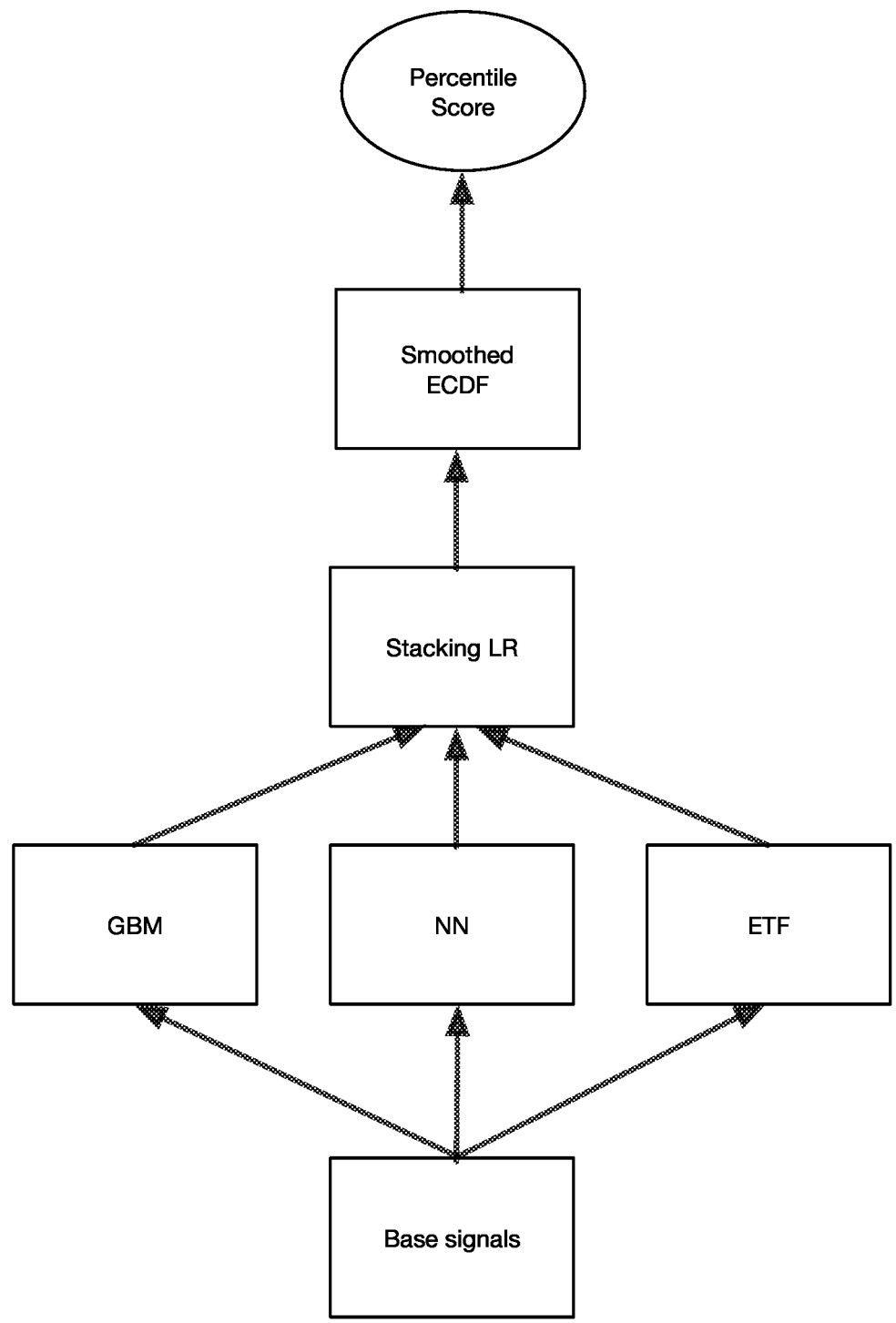

FIG. 6 shows the schematic of a model which combines aspects of the models shown in FIGS. 4 and 5: it contains three submodels, a neutral network (NN), a GBM, and an ETF and a linear ensembling layer, as shown in FIG. 5, but subsequently reprocesses the output of that linear ensembling layer through a Smoothed ECDF. This class of models is useful, because it not only achieves the high discriminative power of the model shown in FIG. 5, but also provides the very desirable uniform output properties of a model which produces outputs through a smoother ECDF, as in the model shown in FIG. 4.

Figure 7:
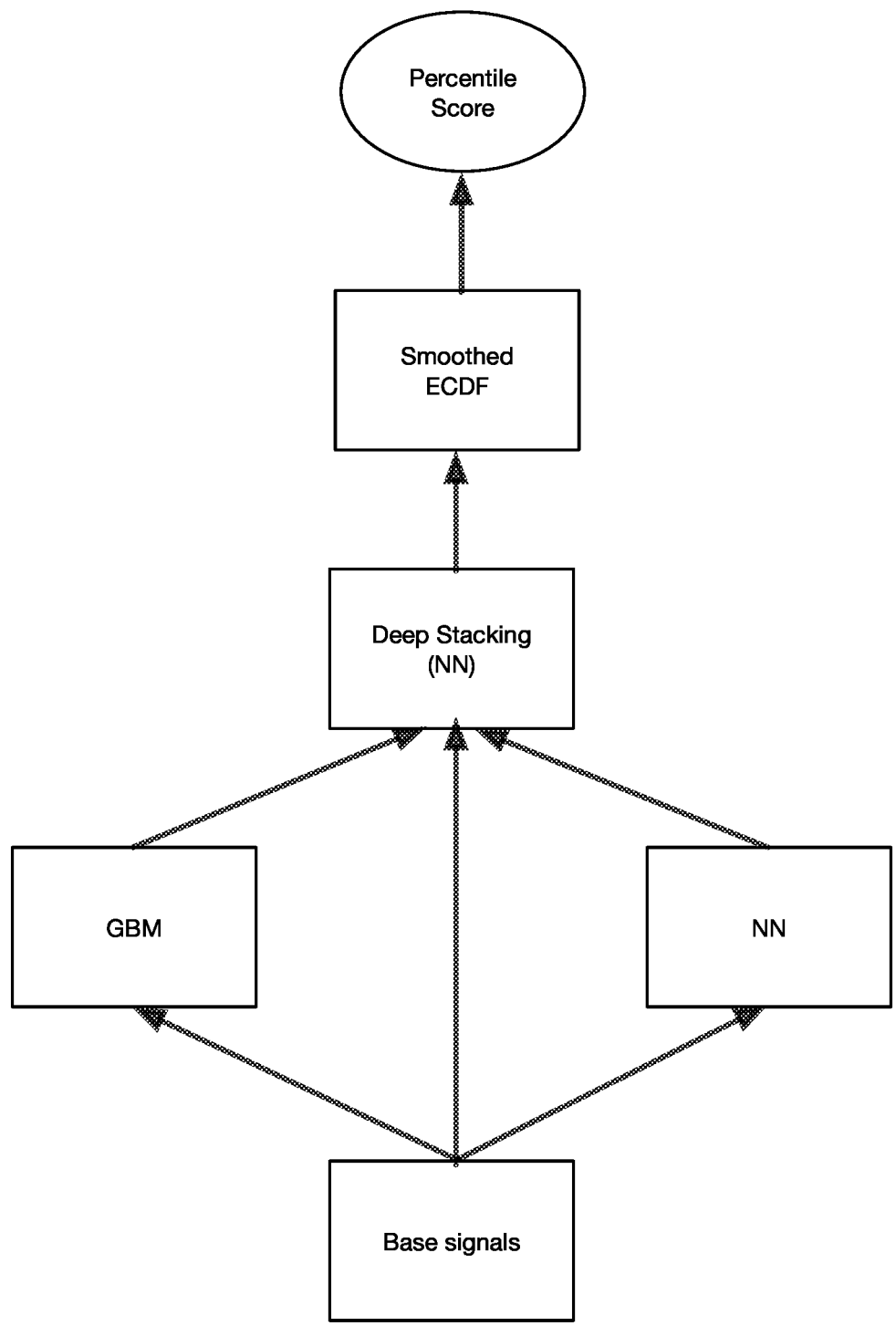

FIG. 7 shows the schematic of a model similar to the model shown in FIG. 6, but replaces the linear stacking layer in the model shown in FIG. 6 with a neural network model. Networks with this form can preserve the representational power and desirable output structure of the model shown in FIG. 6, but can add greater flexibility in their final step. This greater flexibility allows the construction of models which meet specific fairness criteria, provide local confidence estimates, or exhibit combinations of those along with other desirable properties. In some variations, the deep stacking neural network model shown in FIG. 6 can be replaced with any suitable type of continuous machine learning model, such as, for example, a radial basis function layer, a Gaussian mixture, a recurrent neural network, an LSTM, an autoencoder, and the like.

It will be obvious to one of usual familiarity with the art that there is no limitation on the number or types of the inputs to these models, and that the use previously of an example function with domain a subset of R2 was merely presented for clarity. It will also be obvious to one of reasonable skill in the art that the presentation of a single layer of discrete machine learning models with outputs being fed into a single ensembling layer is purely for pedagogical clarity; in fact, in some variations of these systems, a complex and complicated network of ensemblers can be assembled. Machine learning models of that type are routinely seen performing well in machine learning competitions, and have also been used at Facebook to construct and improve face recognition and identification systems. In some variations, the methods described herein teach the generation of more fair models and the analysis of the input feature contributions for models so that they can be reviewed and used in applications for which fairness outcomes, and model drivers must be well-understood and scrutinized.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the disclosed embodiments without departing from the scope of this disclosure defined in the following claims.

We claim:

1. A method implemented by a modelling system and comprising:
   executing a machine learning model building library to iteratively train each of:
   an adversarial classifier that is constructed to predict a value for sensitive attributes based on an output generated by a predictive model, wherein iteratively training the adversarial classifier comprises adjusting first parameters of the adversarial classifier to decrease a first value of a first prediction loss metric for the adversarial classifier, and
   the predictive model, wherein iteratively training the predictive model comprises adjusting second parameters of the predictive model to decrease a second value of an objective function for the predictive model, wherein the objective function is a difference between a second prediction loss metric for the predictive model and the first prediction loss metric;
   determining that a fairness metric threshold is satisfied by the iteratively trained predictive model, wherein predictions of the iteratively trained predictive model provide for improved fairness outcomes as a result of the adversarial classifier correctly classifying one or more of the sensitive attributes; and
   providing the iteratively trained predictive model to a model execution system for deployment in a production environment, wherein the iteratively trained predictive model comprises a credit model configured to generate credit decisions with respect to credit applicants.

2. The method of claim 1, further comprising:
   generating a compositional network that includes the adversarial classifier and the predictive model as subnetworks; and
   pre-training the predictive model on a training data set.

3. The method of claim 1, further comprising:
   generating adversarial training data for the adversarial classifier, wherein the adversarial training data includes another output generated by the predictive model and corresponding values for each of the sensitive attributes; and
   pre-training the adversarial classifier on at least a portion of the adversarial training data.

4. The method of claim 1, wherein the iteratively trained predictive model includes a gradient boosted tree forest (GBM) coupled to base signals and a smoothed approximate empirical cumulative distribution function (ECDF), wherein output values of the GBM are transformed by using the ECDF and presented as a credit score.

5. The method of claim 1, wherein the iteratively trained predictive model includes submodels including one or more of a gradient boosted tree forest (GBM), a neural network, or an Extremely Random Forest (ETF), wherein outputs of the submodels are ensembled together using a stacking function or a combining function and an ensembled output is presented as a credit score.

6. The method of claim 1, further comprising:
   obtaining information identifying the sensitive attributes via a graphical user interface (GUI) provided to an operator device; and
   updating the GUI to display comparison data comprising a contribution of each of a plurality of predictive variables in the predictive model or the iteratively trained predictive model, wherein the comparison data reflects a relative fairness of the predictive model and the iteratively trained predictive model with respect to each of the sensitive attributes.

7. The method of claim 1, wherein the sensitive attributes include one or more of race, ethnicity, age, sex, national origin, sexual orientation, demographics, or military status.

8. The method of claim 1, wherein the predictive model includes a differentiable neural network or the iteratively trained predictive model includes at least one non-differentiable model, linear model, tree model, or logistic regression model.

9. The method of claim 1, further comprising repeating the iterative training of the adversarial classifier and the predictive model using another output of the predictive model and an indication of another sensitive attribute, when the fairness metric threshold is not satisfied, wherein the other output is generated via execution of the iteratively trained predictive model for an input data set.

10. The method of claim 1, wherein the predictive model predicts output values generated by a logistic regression model and the method further comprises training a modified logistic regression model to predict other output values generated by the iteratively trained predictive model.

11. A modelling system, comprising memory having instructions stored thereon and at least one processor coupled to the memory and configured to execute the stored instructions to:
   execute a machine learning model building library to pre-train a predictive model on a training data set and an adversarial classifier on adversarial training data, wherein the adversarial training data includes an output generated by the predictive model and corresponding values for a sensitive attribute and the adversarial classifier is constructed to predict a first value for the sensitive attribute;
   execute the machine learning model building library to iteratively train each of:
   the adversarial classifier comprising adjusting first parameters of the adversarial classifier to decrease a second value of a first prediction loss metric for the adversarial classifier, and
   the predictive model comprising adjusting second parameters of the predictive model to decrease a third value of an objective function for the predictive model, wherein the objective function for the predictive model is a difference between a second prediction loss metric for the predictive model and the first prediction loss metric;

determine that a fairness metric threshold is satisfied by the iteratively trained predictive model, wherein predictions of the iteratively trained predictive model provide for improved fairness outcomes as a result of the adversarial classifier correctly classifying the sensitive attribute; and provide the iteratively trained predictive model to a model execution system for deployment in a production environment, wherein the iteratively trained predictive model comprises a credit model configured to generate credit decisions with respect to credit applicants.

12. The modelling system of claim 11, wherein the iteratively trained predictive model includes at least a gradient boosted tree forest (GBM) and a smoothed approximate empirical cumulative distribution function (ECDF), wherein output values of the GBM are transformed by using the ECDF and presented as a credit score.

13. The modelling system of claim 11, wherein the iteratively trained predictive model includes submodels including at least a gradient boosted tree forest (GBM), a neural network, or an Extremely Random Forest (ETF), wherein outputs of the submodels are ensembled together using a stacking function or a combining function and an ensembled output is presented as a credit score.

14. The modelling system of claim 11, wherein:
the sensitive attribute includes race, ethnicity, age, sex, national origin, sexual orientation, demographics, or military status; and
the iteratively trained predictive model includes a differentiable neural network, non-differentiable model, linear model, tree model, or logistic regression.

15. The modelling system of claim 11, wherein the at least one processor is further configured to execute the stored instructions to:
obtain an indication of the sensitive attribute via a graphical user interface (GUI) provided to an operator device; and
update the GUI to display comparison data comprising a contribution of each of a plurality of predictive variables in the predictive model or the iteratively trained predictive model, wherein the comparison data reflects a relative fairness of the predictive model and the iteratively trained predictive model with respect to the sensitive attribute.

16. The modelling system of claim 11, wherein the at least one processor is further configured to execute the stored instructions to repeat the iterative training of the adversarial classifier and the predictive model using another output of the predictive model and an indication of another sensitive attribute, when the fairness metric threshold is not satisfied, wherein the other output is generated via execution of the iteratively trained predictive model for an input data set.

17. A non-transitory computer-readable medium comprising executable instructions that, when executed by one or more processors, cause the processors to:
execute a machine learning model building library to pre-train a predictive model on a training data set and an adversarial classifier on adversarial training data, wherein the adversarial training data includes a first output generated by the predictive model and corresponding actual values for at least one sensitive attribute and the adversarial classifier is constructed to predict a first value for the at least one sensitive attribute;

execute the machine learning model building library to iteratively train each of:
the adversarial classifier comprising adjusting first parameters of the adversarial classifier to decrease a first value of a first prediction loss metric for the adversarial classifier, and
the predictive model comprising adjusting second parameters of the predictive model to decrease a second value of an objective function for the predictive model, wherein the objective function is a difference between a second prediction loss metric for the predictive model and the first prediction loss metric;
determine that a fairness metric threshold is satisfied by the iteratively trained predictive model, wherein predictions of the iteratively trained predictive model provide for improved fairness outcomes as a result of the adversarial classifier correctly classifying the at least one sensitive attribute; and
provide the iteratively trained predictive model to a model execution system for deployment in a production environment, wherein the iteratively trained predictive model comprises a credit model configured to generate credit decisions with respect to credit applicants.

18. The non-transitory computer-readable medium of claim 17, wherein the iteratively trained predictive model includes at least a gradient boosted tree forest (GBM) and a smoothed approximate empirical cumulative distribution function (ECDF), wherein output values of the GBM are transformed by using the ECDF and presented as a credit score.

19. The non-transitory computer-readable medium of claim 17, wherein the iteratively trained predictive model includes submodels including at least a gradient boosted tree forest (GBM), a neural network, or an Extremely Random Forest (ETF), wherein outputs of the submodels are ensembled together using a stacking function or a combining function and an ensembled output is presented as a credit score.

20. The non-transitory computer-readable medium of claim 17, wherein the predictive model predicts output values generated by a logistic regression model and the executable instructions, when executed by the processors, further cause the processors to train a modified logistic regression model to predict output values generated by the iteratively trained predictive model.

21. The non-transitory computer-readable medium of claim 17, wherein the executable instructions, when executed by the processors, further cause the processors to generate and output to an operator device a graphical user interface (GUI) comprising comparison data comprising a contribution of one or more predictive variables in the predictive model or the iteratively trained predictive model, wherein the comparison data reflects a relative fairness of the predictive model and the iteratively trained predictive model with respect to the sensitive attribute.

22. The non-transitory computer-readable medium of claim 17, wherein the executable instructions, when executed by the processors, further cause the processors to repeat the iterative.

* * * * *